United States Patent
Adachi

(10) Patent No.: US 7,561,642 B2
(45) Date of Patent: Jul. 14, 2009

(54) RECORDING CONDITION SETTING DEVICE, RECORDING/REPRODUCING DEVICE, RECORDING CONDITION SETTING METHOD, CONTROL PROGRAM, AND RECORDING MEDIUM

(75) Inventor: Yoshihisa Adachi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 605 days.

(21) Appl. No.: 11/363,428

(22) Filed: Feb. 24, 2006

(65) Prior Publication Data

US 2006/0193405 A1 Aug. 31, 2006

(30) Foreign Application Priority Data

Feb. 25, 2005 (JP) ............... 2005-051716

(51) Int. Cl.
*H03D 1/00* (2006.01)
*H04L 27/06* (2006.01)

(52) U.S. Cl. ............... 375/341; 375/229; 375/362; 714/794

(58) Field of Classification Search ............ 375/354, 375/341, 229, 362; 714/794
See application file for complete search history.

(56) References Cited

U.S. PATENT DOCUMENTS 5,938,791 A    8/1999 Narahara 6,192,502 B1 *  2/2001  Yamaguchi et al.  ......... 714/795
7,408,869 B2 *  8/2008  Yoshida et al.  ........... 369/275.1
2003/0090980 A1  5/2003  Kashihara et al.
2004/0209293 A1  10/2004  Kashihara et al.

FOREIGN PATENT DOCUMENTS

JP   2003-151219   5/2003
JP   2004-213759   7/2004
JP   2004-253114   9/2004

* cited by examiner

*Primary Examiner*—Ted Wang
(74) *Attorney, Agent, or Firm*—David G. Conlin; Steven M. Jensen; Edwards Angell Palmer & Dodge LLP

(57) ABSTRACT

The recording condition setting device according to the present invention includes (i) a specific pattern detection circuit for detecting, as a specific pattern, one or more patterns having been set by recording information, from one or more decoded bit sequences generated from a reproduction signal received from an optical disc, (ii) a path metric difference classification circuit for classifying one or more specific path metric differences into one or more by-recording-information path metric differences corresponding to one or more by-recording-information patterns, said specific path metric differences being obtained by extracting one or more path metric differences corresponding to the detected specific patterns from path metric differences generated from the reproduction signal, and (iii) a recording condition setting circuit for setting the recording condition based on the classified by-recording-information path metric differences.

23 Claims, 26 Drawing Sheets

| DECODED BIT SEQUENCE | RECORDING INFORMATION | BY-RECORDING-INFORMATION PATH METRIC DIFFERENCE |
|---|---|---|
| ··0<u>11000</u> | 2T | ΔM12 |
| ··01<u>11000</u> | 3T | ΔM13 |
| ·11<u>11000</u> | ≧4T | ΔM14 |

UNDERLINED PART IS SPECIFIC PATTERN "11000"

| DECODED BIT SEQUENCE | RECORDING INFORMATION | BY-RECORDING-INFORMATION PATH METRIC DIFFERENCE |
|---|---|---|
| •0<u>11100</u> | 3T | ΔM23 |
| •1<u>11100</u> | ≧4T | ΔM24 |

UNDERLINED PART IS SPECIFIC PATTERN "11100"

| DECODED BIT SEQUENCE | RECORDING INFORMATION | BY-RECORDING-INFORMATION PATH METRIC DIFFERENCE |
|---|---|---|
| <u>00011</u>0· | 2T | ΔM32 |
| <u>00011</u>10· | 3T | ΔM33 |
| <u>00011</u>11· | ≧4T | ΔM34 |

UNDERLINED PART IS SPECIFIC PATTERN "00011"

| DECODED BIT SEQUENCE | RECORDING INFORMATION | BY-RECORDING-INFORMATION PATH METRIC DIFFERENCE |
|---|---|---|
| 001110· | 3T | ΔM43 |
| 001111· | ≧4T | ΔM44 |

UNDERLINED PART IS SPECIFIC PATTERN "00111"

US 7,561,642 B2

RECORDING CONDITION SETTING DEVICE, RECORDING/REPRODUCING DEVICE, RECORDING CONDITION SETTING METHOD, CONTROL PROGRAM, AND RECORDING MEDIUM

This non-provisional application claims priority under 35 U.S.C. § 119(a) on Patent Application No. 2005-51716 filed in Japan on Feb. 25, 2005, the entire contents of which are hereby incorporated by reference.

FIELD OF THE INVENTION

The present invention relates to: a recording condition setting device, a recording condition setting method; a recording/reproducing device; a control program; and a recording medium, each of which allows for forming a recording mark based on a recording condition constituted of a plurality of elements corresponding to recording information.

BACKGROUND OF THE INVENTION

A recording/reproducing device for storing a large amount of data, such as an optical disc device, stores information by converting a pulse pattern that changes according to recording information into a pulse pattern that is smaller than a minimum unit of information, changing intensity of a laser beam based on the smaller pulse pattern, focusing the beam having been subject to the change of intensity onto the recording medium and heating the recording medium, so as to change physical characteristics of the medium and form a recording mark.

As density of an optical disc becomes higher, a strict set up is required. For example, it is required to set up a recording condition with respect to each mark length (size of a recording mark in a track direction) or with respect to each combination of the mark length and a space (space between recording marks) length.

Conventionally, jitter has been often used as an evaluation value of the reproduction signal quality of a recorded track for the purpose of setting a recording condition of an optical disk. However, PRML (Partial Response Maximum Likelihood) is being adopted as a data detection method for realizing higher density storage recently. Under such condition, jitter which represents irregularities in a direction of a time base is not suitable as an evaluation value.

Further, a bit error rate of a data detection result that has been obtained by PRML is used as the evaluation value, but this brings about many disadvantages as follows: a large number of sample bits are required upon measurement, and defects caused by flaws of a disk tend to influence the evaluation, and other similar disadvantages are brought about.

In such background, an evaluation method, called SAM (Sequenced Amplitude Margin), by which quality of a reproduction signal is evaluated, is proposed (T. Perkins, "A Window Margin Like Procedure for Evaluating PRML Channel Performance"; IEEE Transactions on Magnetics, Vol. 31, No. 2, 1995, p 1109-1114).

A concept of SAM is described with reference to FIGS. 35 and 36. As an example, the following describes a case where a reproduction signal of a bit sequence that has been recorded on the basis of (1, 7) RLL (Run Length Limited) Coding is detected in PRML, in accordance with PR (1, 2, 1) properties.

As shown in FIG. 35, a reproduction signal waveform in accordance with PR (1, 2, 1) properties with an ideal 1T mark free from any distortion or noise has a 1:2:1 level ratio of samples for a channel clock. For a reproduction signal waveform from a 2T or more mark, the level ratio is obtainable from the superimposition of the reproduction waveform from a 1T mark. For example, the sample level ratio is 1:3:3:1 for the one with a 2T mark, 1:3:4:3:1 for the one with a 3T mark, and 1:3:4:4:3:1 for the one with a 4T mark. An ideal reproduction waveform can be assumed for any given bit sequence. There are five ideal sample levels (ideal sample levels): 0, 1, 2, 3, and 4. Here, for convenience, sample levels are normalized so that the maximum amplitude is ±1. At that time, there are five ideal sample levels: −1, −0.5, 0, +0.5, and +1.

Here, as a technique for specifically realizing PRML decoding, Viterbi decoding is adopted. The Viterbi decoding is described as follows with reference to a trellis diagram shown in FIG. 36. In FIG. 36, S(00), S(01), S(10), and S(11) each represents a different state: for example, the state S(00) means that a previous bit is 0 and a current bit is 0. A line linking a state to the other is termed a "branch," which represents a state transition: for example, a branch of S(00)→S(01) represents a bit sequence "001".

In FIG. 36, characters a through f are assigned as an identifier of each branch. An ideal waveform level that is expected in each change in states is added to the characters. For example, because "a" indicates a bit sequence "000", its ideal level is −1. Because "b" indicates a bit sequence "100", its ideal level is −0.5. Here, the S(01)→S(10) and S(10)→S(01) branches are missing from the diagram. This is because the bit sequences "010" and "101" cannot occur due to the d=1 (1,7) RLL.

In the trellis diagram, a "path" is formed by connecting continuous branches between the states. To consider all the paths generated after transiting from any one of states to another means to consider all the possible bit sequences. The maximum likelihood path, or the "correct path," can be determined by comparing the waveform actually reproduced from an optical storage medium with every ideal waveform derived from the paths to find the ideal waveform that is the "closest" to the reproduced waveform, that is, the one with the least Euclidean distance from the reproduction waveform.

A Viterbi decoding procedure based on a trellis diagram will be specifically described. At any given time, there are two paths merging at each of states S(00) and S(11), whereas there is a single path coming in to each of S(01) and S(10). Of the two paths merging at S(00) and S(11), retain the one with a less Euclidean distance between the ideal waveform and the reproduction waveform; this leaves four paths each terminating at a different one of the four states at any given time.

Here, the square of the Euclidean distance between the ideal waveform for a path and the reproduction waveform is termed the path metric. The path metric is calculated by summing up branch metrics for all branches making up the path (the branch metric is the square of the difference between the ideal sample level of the branch and the sample level of a reproduction waveform).

When a sample level of the reproduction waveform at time t is X[t], branch metrics of branches a, b, c, d, e, and f at time t are Ba[t], Bb[t], Bc[t], Bd[t], Be[t], and Bf[t] respectively, and path metrics of survival paths at the states S(00), S(01), S(10), and S(11) at time t are M(00)[t], M(01)[t], M(10)[t], and M(11)[t] respectively, the branch metric is calculated in accordance with the equation (1), and the path metric is calculated in accordance with the equation (2). A process of selecting a smaller path metric from M(00)[t] and M(11)[t] corresponds to determination of a survival path.

$$Ba[t]=(X[t]+1)^2$$

$$Bb[t]=Bc[t]=(X[t]+0.5)^2$$

$$Bd[t]=Be[t]=(X[t]-0.5)^2$$

$$Bf[t]=(X[t]-1)^2 \quad \text{equation (1)}$$

$$M(00)[t]=\text{Min}\{M(00)[t-1]+Ba[t], M(10)[t-1]+Bb[t]\}$$

$$M(01)[t]=M(00)[t-1]+Bc[t]$$

$$M(10)[t]=M(11)[t-1]+Bd[t]$$

$$M(11)[t]=\text{Min}\{M(01)[t-1]+Be[t], M(11)[t-1]+Bf[t]\}$$

$$(\text{Min}\{m,n\}=m(\text{if } m \leq n):n(\text{if } m>n)) \quad \text{equation (2)}$$

When the procedure for determining the survival path is repeated every time the sample values of the reproduction signal waveform are inputted, a path with a greater path metrics is eliminated, so that the number of paths is gradually narrowed into one. This one is regarded as the correct path, so that the original data bit sequence is correctly reproduced.

Here, let us now consider conditions under which Viterbi decoding is correctly done. For the correct path to be ultimately chosen, the path metric must be smaller for the correct path than for other, error path every time a survival path is determined. This condition is expressed by the equation (3).

(When a correct bit sequence is " . . . 000")

$$\Delta M=(M(10)[t-1]+Bb[t])-(M(00)[t-1]+Ba[t])>0$$

(When a correct bit sequence is " . . . 100")

$$\Delta M=(M(00)[t-1]+Ba[t])-(M(10)[t-1]+Bb[t])>0$$

(When a correct bit sequence is " . . . 011")

$$\Delta M=(M(11)[t-1]+Bf[t])-(M(01)[t-1]+Be[t])>0$$

(When a correct bit sequence is " . . . 111")

$$\Delta M=(M(01)[t-1]+Be[t])-(M(11)[t-1]+Bf[t])>0 \quad \text{equation (3)}$$

(When a correct bit sequence is " . . . 001" or " . . . 110")

Because determination of a survival path never fails to be performed correctly, a relation of $\Delta M>0$ always exists.

In the equation (3), $\Delta M$ is a difference between path metrics of two paths one of which will be the survival path, and the difference is termed SAM. It is necessary that SAM>0 so that any error does not occur, which shows that: the larger SAM becomes, the less error occurs.

As a method for compensating and setting a recording condition by using SAM, Japanese Unexamined Patent Publication No. 151219/2003 (Tokukai 2003-151219) (published on May 23, 2003) (Document 1) discloses a method in which: a first pattern including a coded bit sequence "10" or "01", a second pattern whose coded bit sequence "10" or "01", is replaced with "11", and a third pattern whose coded bit sequence "10" or "01" is replaced with "00" are provided, a first distance between a reproduced signal and the first pattern, a second distance between the reproduced signal and the second pattern, and a third distance between the reproduced signal and the third pattern are obtained, and a recording condition is compensated and set based on a first distance difference D2 between the first distance and the second distance (=the second distance−the first distance) and the second distance difference D3 between the first distance and the third distance (=the third distance−the first distance).

Here, the following describes an example of the method for compensating a recording condition disclosed in Document 1. The first pattern is "111000", the second pattern is "111100", and the third pattern is "110000". At that time, the second pattern is different from the first pattern in that the coded bit sequence "10" is replaced with "11". The third pattern is different form the first pattern in that the coded bit sequence "10" is replaced with "00".

FIG. 37 illustrates paths of the first and second patterns on a trellis diagram. The first distance difference D2 between the first distance and the second distance (the first distance is between the reproduction signal and the first pattern and the second distance is between the reproduction signal and the second pattern) corresponds to a path metric difference at a time t+4 in FIG. 37. Further, FIG. 38 illustrates paths of the first and third patterns on a trellis diagram. The second distance difference D3 between the first distance and the third distance (the first distance is between the reproduction signal and the first pattern and the third distance is between the reproduction signal and the third pattern) corresponds to a path metric difference at a time t+3 in FIG. 38.

At that time, when the first pattern is stored, the reproduction signal of the first pattern is more likely to be misidentified as the second pattern as the first distance difference D2 is nearer to 0. Further, when the first pattern is stored, the reproduction signal of the first pattern is more likely to be misidentified as the third pattern as the second distance difference D3 is nearer to 0. When compensation of a record is performed so that the probability at which the reproduction signal of the first pattern may be misidentified as the second pattern is equal to the probability at which the reproduction signal of the first pattern may be misidentified as the third pattern, it is possible to reduce a probability of misidentifying the reproduction signal of the first pattern.

Here, a phenomenon in which the reproduction signal of the first pattern is misidentified as the second pattern when the first pattern is stored is opposite to a phenomenon in which the reproduction signal of the first pattern is misidentified as the third pattern when the first pattern is stored. Therefore, when the distance between the first distance difference D2 and the center 0 is substantially the same as the distance between the difference between −D3 which is the negative value of the second distance difference D3 and the center 0, it is possible to reduce the possibility at which the reproduction signal of the first pattern may be misidentified.

However, there is a case where a DC offset occurs in a reproduction signal to be inputted to a Viterbi decoding circuit for performing Viterbi decoding due to variations of a direct current level caused by deviation in duty of a mark on a disc or to deviation of offset adjustment of an A/D converter for converting the reproduction signal from analog data to digital data. Here, DC offset is a difference between a level of a signal inputted to a Viterbi decoding circuit when there is no reproduction signal and a level of an amplitude center (0) level of an ideal waveform. FIG. 39 illustrates a waveform (full line) resulting from occurrence of DC offset in an ideal waveform (broken line).

FIG. 40 illustrates changes in the first distance difference D2 and −D3 which is the negative value of the second distance difference when the DC offset occurs in the ideal waveform. Ideal values are 1.5 and −1.5 respectively. The values change according to the DC offset.

Document 1 discloses that: when D2 and −D3 are positioned so that the distance between D2 and the center 0 is substantially the same as the distance between −D3 and the center 0, it is possible to reduce the probability of misidentifying the reproduction signal. As such, when the distance from the center 0 changes due to the influence of DC offset, it is impossible to obtain a good recording condition.

Further, there is a case where clock phase deviation occurs in the reproduction signal to be inputted to the Viterbi decoding circuit for performing Viterbi decoding due to misadjustment of offset in a reproduction clock extraction circuit for extracting a reproduction clock required in the A/D converter from the reproduction signal. Here, clock phase deviation is a shift in DC between an ideal sampling phase of PRML and a clock phase. FIG. 41 illustrates a case (black point) where sampling is performed so that clock phase deviation in DC occurs in an ideal sampling phase (white point).

FIG. 42 illustrates changes in the first distance difference D2 and −D3 which is the negative value of the second distance difference when the clock phase deviation occurs in the ideal waveform. The ideal values are 1.5 and −1.5 respectively. The values change according to the clock phase deviation.

Document 1 discloses that: as long as D2 and −D3 are positioned so that the distance between D2 and the center 0 is substantially the same as the distance between −D3 and the center 0, it is possible to reduce the probability of misidentifying the reproduction signal. Therefore, there is a case where a good recording condition cannot be obtained due to the influence of clock phase deviation.

Further, Document 1 discloses an arrangement in which the recording condition is compensated and set by using the first distance difference D2 between the first distance and the second distance (the first distance is between the reproduction signal and the first pattern and the second distance is between the reproduction signal and the second pattern) and the second distance difference D3 between the first distance and the third distance (the third distance is between the reproduction signal and the third pattern). However, it is not so arranged that: first distance differences for each mark length are further classified by a pattern including the first pattern and the values of the first distance differences are compared with each other, so as to detect an even condition of an edge deviation of a recording mark between mark lengths. Further, it is not so arranged that: second distance differences for each mark length are classified by a pattern including the first pattern and the values of the second distance differences are compared with each other, so as to detect an even condition of an edge deviation of a recording mark between mark lengths. Therefore, the edge deviation between mark lengths may occur, with a result that a good recording condition cannot be obtained.

SUMMARY OF THE INVENTION

An object of the present invention is to provide (i) a recording condition setting device capable of detecting an edge deviation of a recording mark and obtaining a good recording condition without an influence of a DC offset, a clock phase deviation, and the like, (ii) a recording/reproducing device, (iii) a recording condition setting method, a control program, and (iv) a storage medium.

In order to achieve the object, a recording condition setting device according to the present invention is a recording condition setting device for setting a recording condition that is constituted of a plurality of elements corresponding to each of plural items of recording information and is used to form a recording mark on a storage medium, the recording condition setting device comprising: Viterbi decoding means for generating one or more path metric differences while decoding one or more bit sequences by Viterbi decoding from a reproduction signal from the storage medium so as to generate one or more decoded bit sequences; specific pattern detection means for detecting, as a specific pattern, one or more patterns having been set with respect to each of the plural items of recording information, from the decoded bit sequences generated by the Viterbi decoding means; path metric difference classification means which includes (i) specific path metric difference extraction means for extracting one or more specific path metric differences corresponding to the specific patterns detected by the specific pattern detection means, from the path metric differences generated by the Viterbi decoding means and (ii) by-recording-information pattern detection means for detecting one or more by-recording-information patterns having corresponding recording information out of the plural items of recording information from the decoded bit sequences including the specific patterns detected by the specific pattern detection means, said path metric difference classification means classifying the specific path metric differences extracted by the specific path metric difference extraction means into one or more by-recording-information path metric differences corresponding to the by-recording-information patterns detected by the by-recording-information pattern detection means; and recording condition setting means for setting the recording condition based on the by-recording-information path metric differences classified by the path metric difference classification means.

With the arrangement, the path metric differences corresponding to the specific patterns (specific path metric differences) are classified by recording information and the recording condition is set based on the classified path metric differences. Therefore, the recording condition is set based on the by-recording-information path metric differences obtained by actually reproducing a recording mark. As a result, it is possible to set the recording condition without an influence of adding a DC offset to a reproduction signal or an influence of a clock phase deviation which occurs in a reproduction clock. Therefore, it is possible to set a suitable recording condition.

Further, it is possible to set a recording condition in forming a recording mark with respect to each of the plural items of recording information. As a result, the specific path metric differences are classified by the recording information, so that it is possible to suitably grasp a condition of an edge deviation between recording mark lengths which is caused by the specific path metric differences.

Therefore, it is possible to store recording information on a storage medium under a suitable recording condition under which the edge deviation between recording mark lengths is taken into account.

A recording condition setting method according to the present invention is a method for causing a recording/reproducing device, which forms a recording mark on a storage medium on the basis of a recording condition constituted of a plurality of elements corresponding to plural items of recording information, to set the recording condition, the recording condition setting method comprising: a first step of generating one or more path metric differences while decoding one or more bit sequences by Viterbi decoding from a reproduction signal from the storage medium so as to generate one or more decoded bit sequences; a second step of detecting one or more specific patterns from the decoded bit sequences generated in the first step; a third step of extracting one or more specific path metric differences corresponding to the specific patterns detected in the second step, from the path metric differences generated in the first step; a fourth step of detecting one or more by-recording-information patterns having corresponding recording information out of the plural items of recording information from the decoded bit sequences including the specific patterns detected in the second step; a fifth step of classifying the specific path metric differences extracted in the third step into one or more by-recording-information path metric differences corresponding to the by-recording-information patterns detected in the fourth step; and a sixth step of setting the recording condition based on the by-recording-information path metric differences classified in the fifth step.

With the arrangement, the path metric differences corresponding to the specific patterns (specific path metric differences) are classified by recording information and the recording condition is set based on the classified path metric differences. Therefore, the recording condition is set based on the by-recording-information path metric differences obtained by actually reproducing a recording mark. As a result, it is possible to set the recording condition without an influence of a DC offset which occurs in a reproduction signal or an influence of a clock phase deviation which occurs in a reproduction clock. Therefore, it is possible to set a suitable recording condition.

Further, it is possible to set a recording condition in forming a recording mark with respect to each of the plural items of recording information. As a result, the specific path metric differences are classified by the recording condition, so that it is possible to suitably grasp a condition of an edge deviation between recording mark lengths which is caused by the specific path metric differences.

Therefore, it is possible to store recording information on a storage medium under a suitable recording condition under which the edge deviation between recording mark lengths is taken into account.

For a fuller understanding of the nature and advantages of the invention, reference should be made to the ensuing detailed description taken in conjunction with the accompanying drawings.

DESCRIPTION OF THE EMBODIMENTS

Embodiment 1

An embodiment of the present invention is explained with reference to FIGS. 1 through 27. In the present embodiment, an example of a recording/reproducing device according to the present invention is an optical disc device based on PRML (Partial Response Maximum Likelihood).

Figure 1:
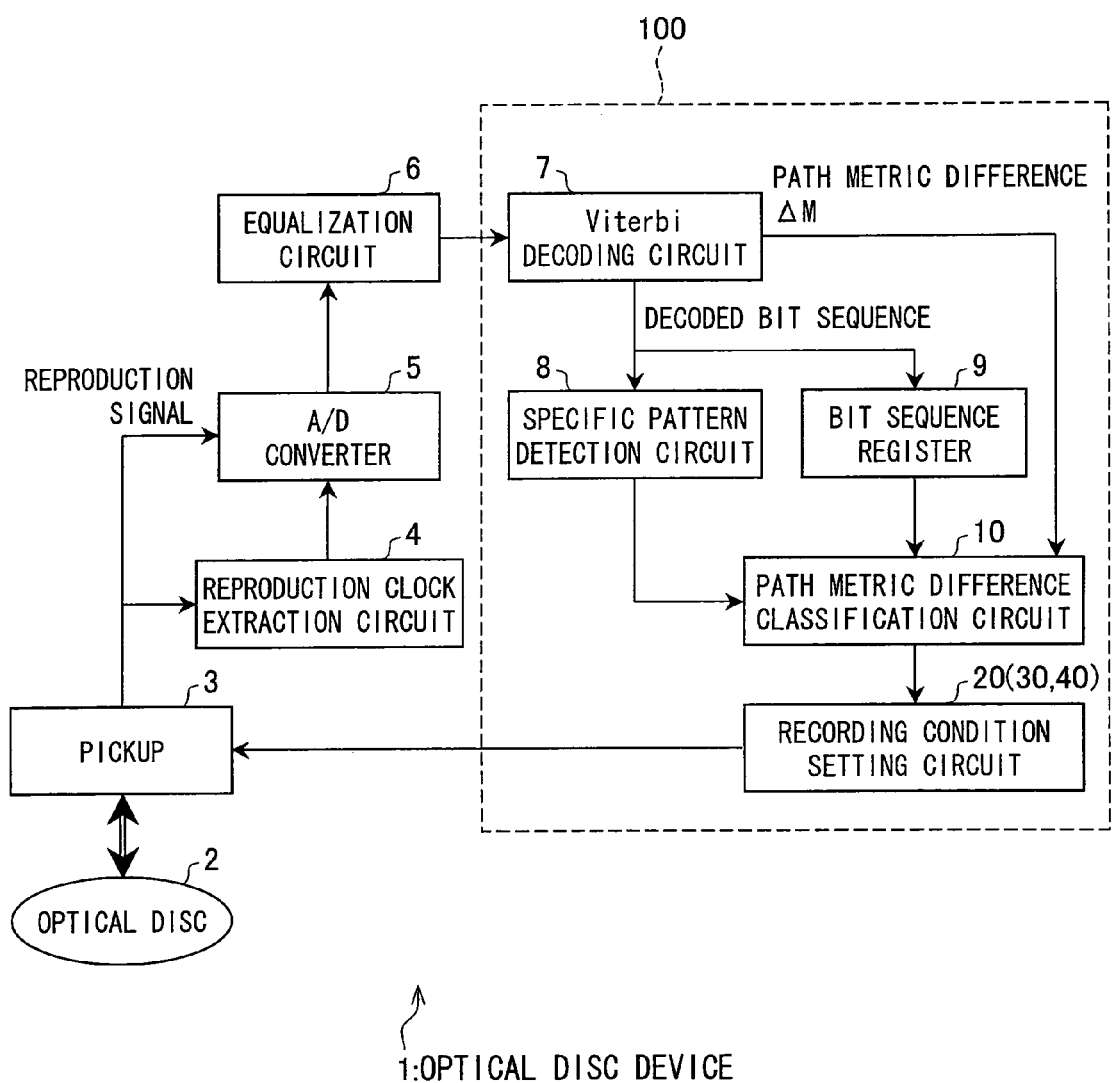
FIG. 1 is a block diagram illustrating a main structure of an optical disc device according to an embodiment of the present invention.

FIG. 1 is a block diagram schematically illustrating an optical disc device 1 according to the present embodiment.

As illustrated in FIG. 1, the optical disc device 1 includes a pickup 3, a reproduction clock extraction circuit 4, an A/D converter 5, an equalization circuit 6, a Viterbi decoding circuit 7, a specific pattern detection circuit 8, a bit sequence register 9, a path metric difference classification circuit 10, and a recording condition setting circuit 20 (30 and 40). Note that the optical disc device 1 is provided with a recording condition setting device 100 constituted of the Viterbi decoding circuit 7, the specific pattern detection circuit 8, the bit sequence register 9, the path metric difference decoding circuit 10, and the recording condition setting circuit 20 (30 and 40). The optical disc device 1 is detailed later.

The following explains a modulation method used in the optical disc device 1 by exemplifying (1, 7) RLL (Run Length Limited code). However, the modulation method of the present invention is not limited to the (1, 7) RLL modulation and may be other modulation.

A (1, 7) RLL code is a code that limits the minimum value and the maximum value of an inversion interval in a magnetic digital record or an optical digital record. In the (1, 7) RLL modulation, as for the minimum recording mark, a pulse sequence of a recording pulse for generating a recording mark is constituted of a top section and a last section. As for a recording mark that is longer than the minimum recording mark, the pulse sequence of the recording pulse is constituted of: a top section; a last section; and an intermediate section which is provided between the top section and the last section and which corresponds to the mark length. This is detailed later.

Note that in other modulation, there is a case where the minimum recording mark length starts from 3T. At that time, the minimum recording mark length is constituted of a top section, an intermediate section, and a last section (e.g. DVD-RW). Further, there is a case where the minimum recording mark length is constituted of only a top section (e.g. DVD-R).

Figure 2:
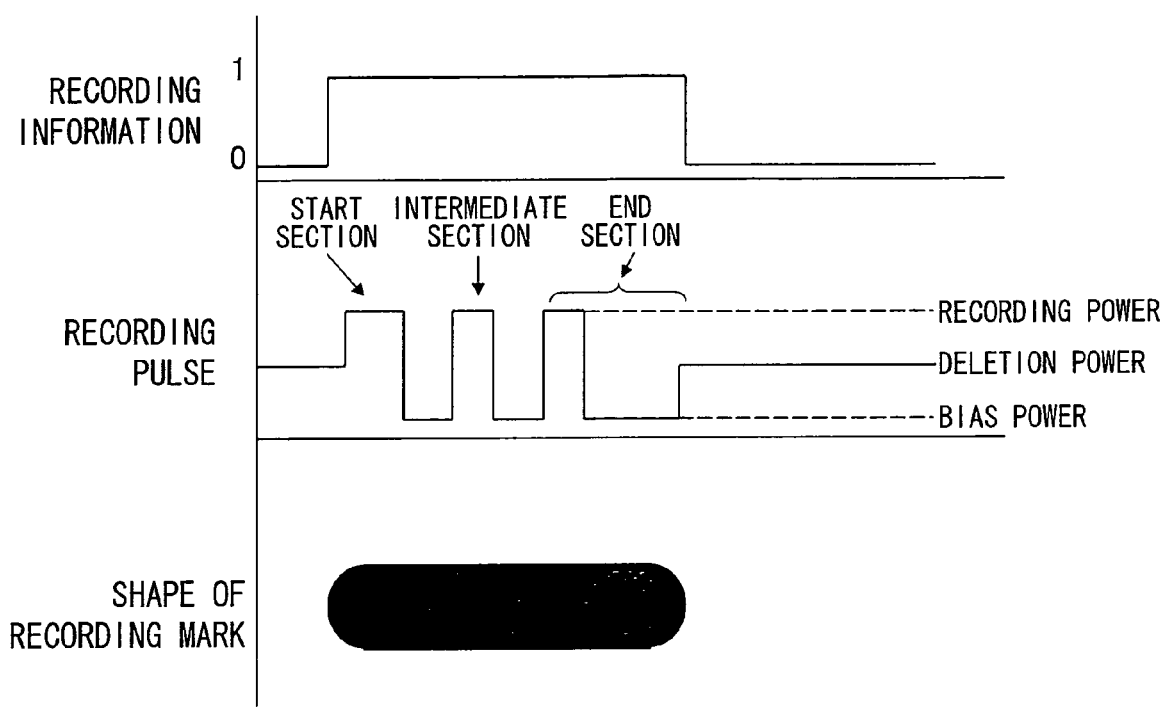
FIG. 2 is a timing chart illustrating how a pulse pattern corresponding to recording information is set up.

FIG. 2 illustrates recording information, a pulse sequence corresponding to the recording information, and a shape of a generated recording mark. The pulse sequence of a recording pulse corresponding to the recording information is set in consideration of medium temperature distribution for performing recordation on an optical disc 2. Note that FIG. 2 illustrates a pulse sequence corresponding to a 4T mark. As described above, the pulse sequence is constituted of: a top section; a last section; and an intermediate section which is provided between the top section and the last section and which corresponds to a 4T mark or more.

Here, "T" indicates a time corresponding to one cycle of a clock. Therefore, for example, a 4T mark means a mark which records "1" in a time corresponding to four cycles of a clock, namely, a recording domain which records "1", in a time corresponding to four cycles of a clock. Further, as illustrated in FIG. 2, the pulse sequence is constituted of elements which indicate power levels of a recording power, a deletion power, and a bias power. The recording power, the deletion power, and the bias power are termed generically "recording power condition". Note that in FIG. 2, the recording powers of pulses of the top section and the intermediate section are identical with each other. However, the present invention is not limited to this. Each pulse (top section and intermediate sections) may have a different recording power.

Figure 3:
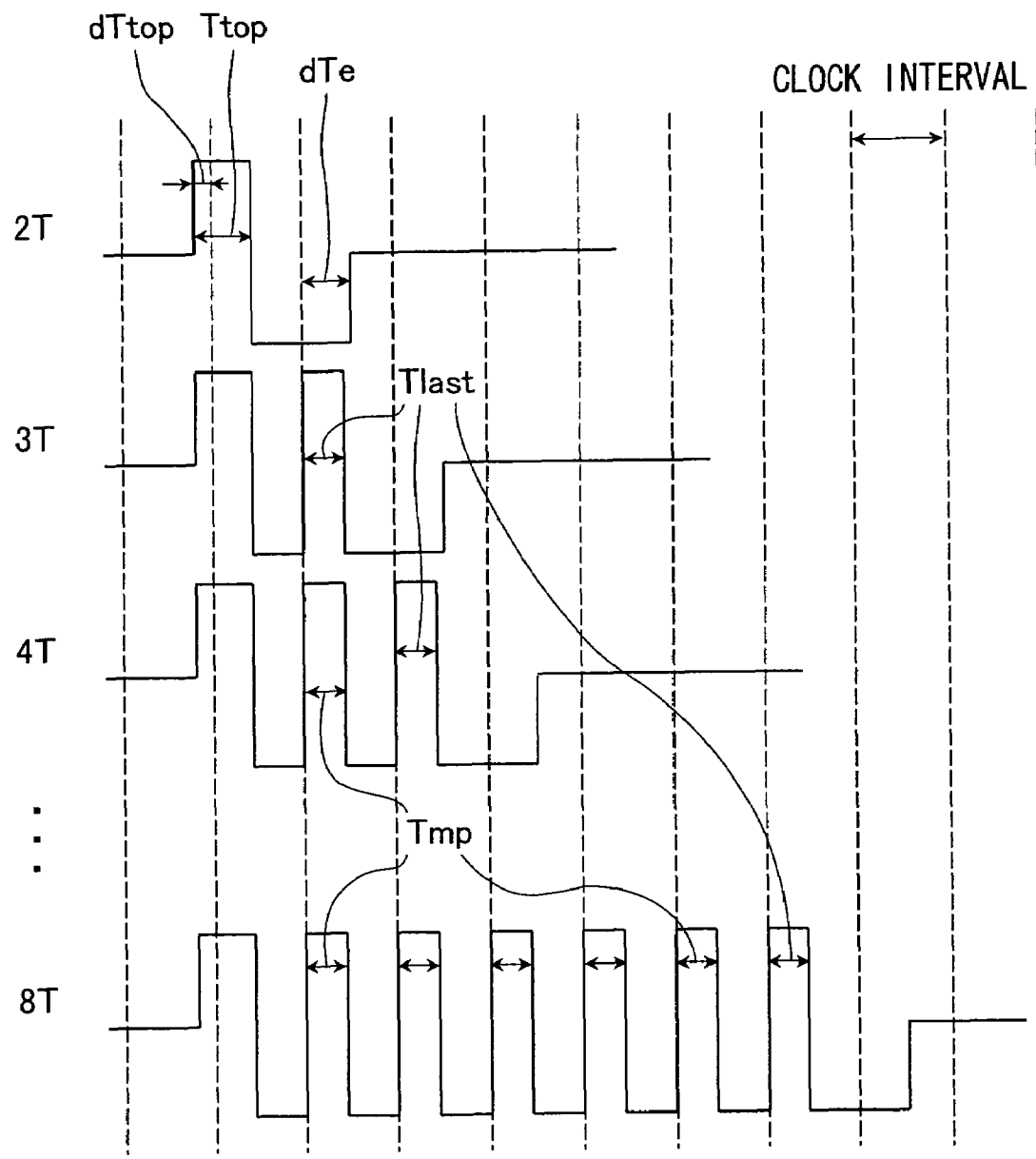
FIG. 3 is a timing chart illustrating how a recording condition corresponding to recording information is set up.

Next, FIG. 3 illustrates pulse sequences for generating marks (from a 2T mark to an 8T mark) and recording pulse conditions for realizing the pulse sequences. Each of the recording pulse conditions is made by combining a plurality of elements such as a top section pulse start position dTtop, a top section pulse width Ttop, a last section pulse end position dTe, an intermediate section pulse width Tmp, a last section pulse width Tlast. These elements are termed generically "recording pulse condition". The top section pulse start position dTtop indicates a pulse start position of a top section (an element for changing a front edge section of a recording mark), the top section pulse width Ttop indicates a pulse width of the top section, the last section pulse end position dTe indicates a pulse end position of the last section (an element for changing a rear edge section of the recording mark), the last section pulse width Tlast indicates a pulse width of the last section, and the intermediate section pulse width Tmp indicates a pulse width of the intermediate section. With changes in values of these elements, the shape of a generated recording mark changes.

Each of the recording pulse conditions is set according to the length of recording condition, namely, mark length. Settings of each recording pulse condition are independent of each other. Namely, a pulse sequence whose recording mark length is 2T is constituted of a top section and a last section and its recording pulse condition is constituted of a top section pulse start position dTtop, a top section pulse width Ttop, and a last section pulse end position dTe. However, this recording pulse condition is not used to set a top section and last section of other mark length. For example, a top section pulse start position dTtop, a top section pulse width Ttop, and a last section pulse end position dTe of a recording pulse condition of a 3T mark are entirely different from those of the recording pulse condition of the 2T mark. The recording pulse conditions are set separately.

The following explains a case where mark lengths are classified into three kinds: 2T, 3T, and ≧4T as recording information, and recording pulse conditions are set to each mark length.

First, a relation between a recording pulse condition and a generated recording mark is explained. When the value of a top section pulse start position dTtop becomes large, the start position of a recording mark moves forward, and when the value of the top section pulse start position dTtop becomes small, the start position of the recoding mark moves backward. Further, when the value of a top section pulse width Ttop becomes large, the width of a top section of the recording mark (the size of the recording mark in a direction vertical to a loop direction of the track) becomes large, and when the value of the top section pulse width Ttop becomes small, the width of the top section of the recording mark becomes small. When the value of a last section pulse width Tlast becomes large, the width of a last section of the recording mark (the size of the recording mark in a direction vertical to a loop direction of the track) becomes large, and an end position of the recording mark moves backward. When the value of the last section pulse width Tlast becomes small, the width of the last section of the recording mark becomes small, and the end position of the recording mark moves forward. When the value of a last section pulse end position dTe becomes large, an end position of the recording mark moves backward, and when the value of the last section pulse end position dTe becomes small, the end position of the recording mark moves forward. When the value of an intermediate pulse width Tmp becomes large, the width of the recording mark (the size of the recording mark in a direction vertical to a loop direction of the track) becomes large, and when the value of the intermediate pulse width Tmp becomes small, the width of the recording mark becomes small. Further, the width of the recording mark (referred to as "mark width" hereinafter) changes according to a change in the recording power condition. The recording power condition and the recording pulse condition are generically termed "recording condition" hereinafter.

Next, how sections of the optical disc device 1 operate is explained below with reference to a function block diagram illustrated in FIG. 1 and a flowchart illustrated in FIG. 4.

First, a recording condition is set (step S1). Here, the recording condition is set by a recording condition setting device 100. Namely, the recording condition setting device 100 sets a recording condition which is constituted of a plurality of elements corresponding to recording information and is used to form a recording mark on the optical disc 2 being a storage medium. Finally, a recording condition setting circuit 20 sets a predetermined recording condition.

Next, a recording data pattern is recorded on the optical disc 2 (step S2).

To be specific, the pickup 3 emits a light beam onto the optical disc 2, thereby recording the recording data pattern.

Next, a recording domain is reproduced (step S3).

To be specific, the pickup 3 emits a light beam onto the optical disc 2, receives a reflected light, converts the light into an electric signal, and outputs the signal as a reproduction signal. The reproduction signal at that time is analog data. The reproduction signal having been outputted from the pickup 3 is outputted to the reproduction clock extraction circuit 4 and the A/D converter 5 in a subsequent stage.

The reproduction clock extraction circuit 4 is constituted of a PLL (Phase Locked Loop) circuit and extracts, from the inputted reproduction signal, a reproduction clock required in the A/D converter 5.

Therefore, the A/D converter 5 converts the analog data into a reproduction signal being digital data at a timing of the reproduction clock extracted in the reproduction clock extraction circuit 4. The reproduction signal of the converted digital data is subject to waveform equalization in the equalization circuit 6 in a next stage and inputted to the Viterbi decoding circuit 7.

Next, Viterbi decoding is performed (step S4).

To be specific, the Viterbi decoding circuit 7 calculates a path metric as with in a conventional example. Namely, in accordance with the equations (1) and (2), the square of a difference between the digital data of the input reproduction signal and each of the ideal levels of branches in a trellis diagram (branch metric) is summed up with respect to each branch constituting a path.

A path metric is calculated every time digital data of the reproduction signal is inputted. In the Viterbi decoding circuit 7, a path whose path metric is the minimum finally remains as a survival path, so that a decoded bit sequence is obtained. As a result, in accordance with the equation (3), SAM is obtained as $\Delta M$, which is a path metric difference between two paths under a correct state. Processes up to here are the same as the conventional example. The decoded bit sequence is inputted to the specific pattern detection circuit 8 and the bit sequence register 9. Further, the path metric difference $\Delta M$ is inputted to the path metric difference classification circuit 10.

Next, a path metric difference corresponding to a specific pattern is extracted (step S5).

To be specific, when a specific pattern is detected from the decoded bit sequence, a signal is outputted from the specific pattern detection circuit 8 to the path metric difference classification circuit 10, and a path metric difference $\Delta M$ having been inputted from the Viterbi decoding circuit 7 in accordance with the specific pattern is stored, as a specific path metric difference, in a memory (not shown) in the path metric difference classification circuit 10. At that time, when a plurality of specific path metric differences are detected, an average value of them is calculated.

Next, thus detected specific path metric differences are classified into by-recording-information path metric differences (step S6).

To be specific, the specific path metric differences stored in the memory (not shown) in the path metric difference classification circuit 10 are classified by recording information, based on information of the bit sequence register 9.

Figure 5:
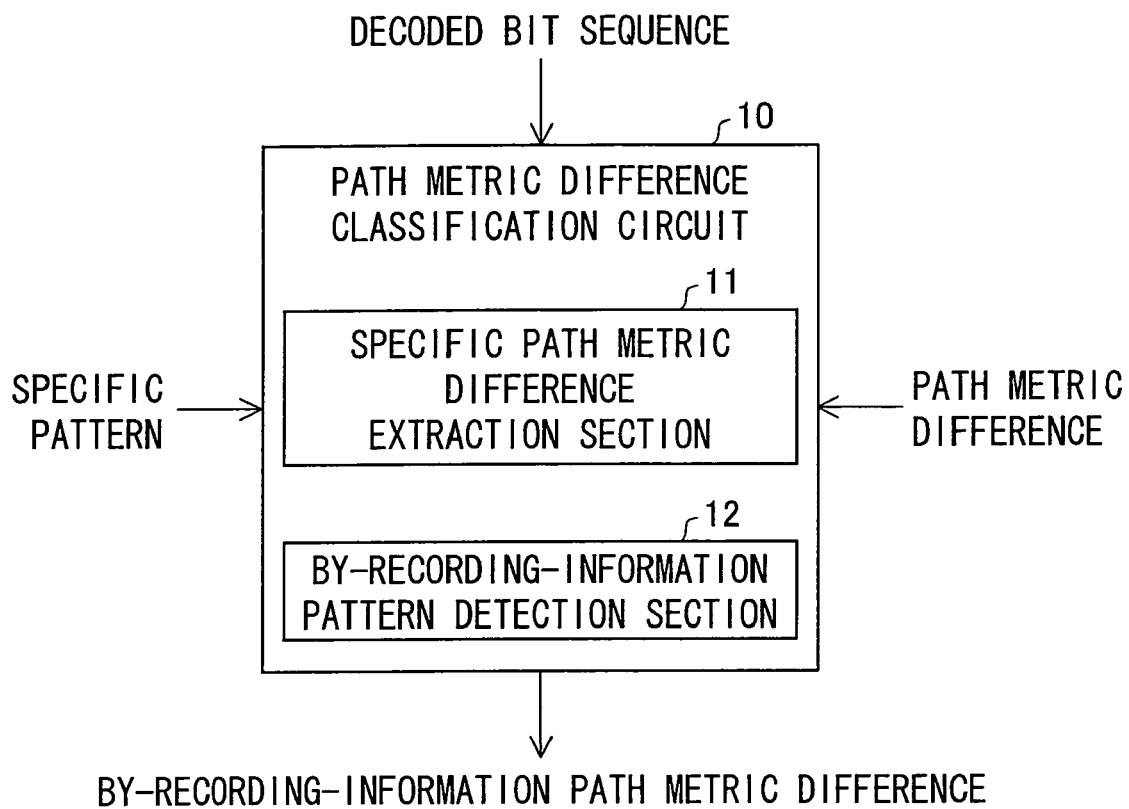
FIG. 5 is a block diagram schematically illustrating a path metric difference classification circuit provided in the optical disc device illustrated in FIG. 1.

Namely, as illustrated in FIG. 5, the path metric difference classification circuit 10 includes (i) a specific path metric difference extraction section 11 for extracting specific path metric differences corresponding to specific patterns detected by the specific pattern detection circuit 8 from path metric differences generated by the Viterbi decoding circuit 7 and (ii) a by-recording-information pattern detection section 12 for detecting by-recording-information patterns having corresponding recording information out of plural sets of recording information from a decoded bit sequence having the specific patterns detected by the specific pattern detection circuit 8. The path metric difference classification circuit 10 classifies the specific path metric differences extracted by the specific path metric difference extraction section 11 into the by-recording-information path metric differences corresponding to the by-recording-information patterns extracted by the by-recording-information pattern detection section 12.

Figures 6, 7:
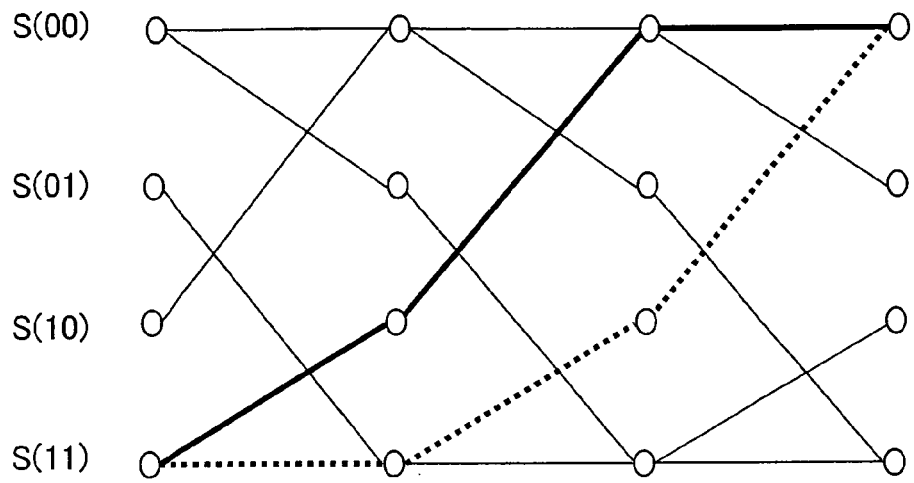
FIG. 6 is a trellis diagram used in Viterbi decoding.
FIG. 7 is a figure illustrating relations between decoded bit sequences corresponding to recording information and path metric differences with respect to each recording information.

FIG. 6 illustrates two paths under a correct state in a trellis diagram when a specific pattern is "11000" for example. A thick full line indicates a correct path and a thick broken line indicates an error path. The SAM ideal value of the specific pattern is 1.5. FIG. 7 illustrates classification in which each decoded bit sequence including the specific pattern "11000" is classified by recording information.

"Which recording information corresponds to the decoded bit sequence including the specific pattern" is decided based on a decoded bit sequence stored in the bit sequence register 9. Namely, when the decoded bit sequence including the specific pattern is "•011000" (• may be either 0 or 1) in the bit sequence register 9, the specific path metric difference at that time is regarded as a by-recording-information path metric difference $\Delta M12$ corresponding to a 2T mark and is stored in the memory (not shown). When the decoded bit sequence including the specific pattern is "•0111000" (• may be either 0 or 1) in the bit sequence register 9 or when a decoded bit sequence including a specific pattern is "•1111000" (• may be either 0 or 1), the specific path metric difference at that time is regarded as a by-recording-information path metric difference $\Delta M13$ or $\Delta M14$ corresponding to a 3T mark or a 4T mark or more and is stored in the memory (not shown). At that time, when a plurality of by-recording-information path metric differences are detected as the by-recording-information path metric differences $\Delta M12$, $\Delta M13$, and $\Delta M14$ respectively, an average value of the by-recording-information path metric differences is calculated.

Next, it is decided whether or not the by-recording-information path metric differences are within a predetermined range (step S7).

To be specific, a difference among the by-recording-information path metric differences $\Delta M12$, $\Delta M13$, and $\Delta M14$ that have been classified in the path metric difference classification circuit 10 is calculated, thereby deciding whether or not the difference is within the predetermined range. Here, the recording condition setting circuit 20 decides whether the by-recording-information path metric differences are within the predetermined range.

When the difference is within the predetermined range, the recoding condition at that time is regarded as a condition capable of obtaining a good recording state and used in subsequent recording operations.

When the difference is beyond the predetermined range, the recording condition is changed (step S8) and the process goes back to step S1.

To be specific, with the recording condition at that time, it is impossible to obtain a good recording state. Therefore, the recording condition is changed based on the values of the by-recording-information path metric differences $\Delta M12$, $\Delta M13$, and $\Delta M14$ that have been classified in the path metric difference classification circuit 10 and the changed recording condition is set in the recording condition setting circuit 20.

The following explains how to change a recording condition by using values of the by-recording-information path metric differences $\Delta M12$, $\Delta M13$, and $\Delta M14$ when the specific pattern is "11000".

Figure 8:
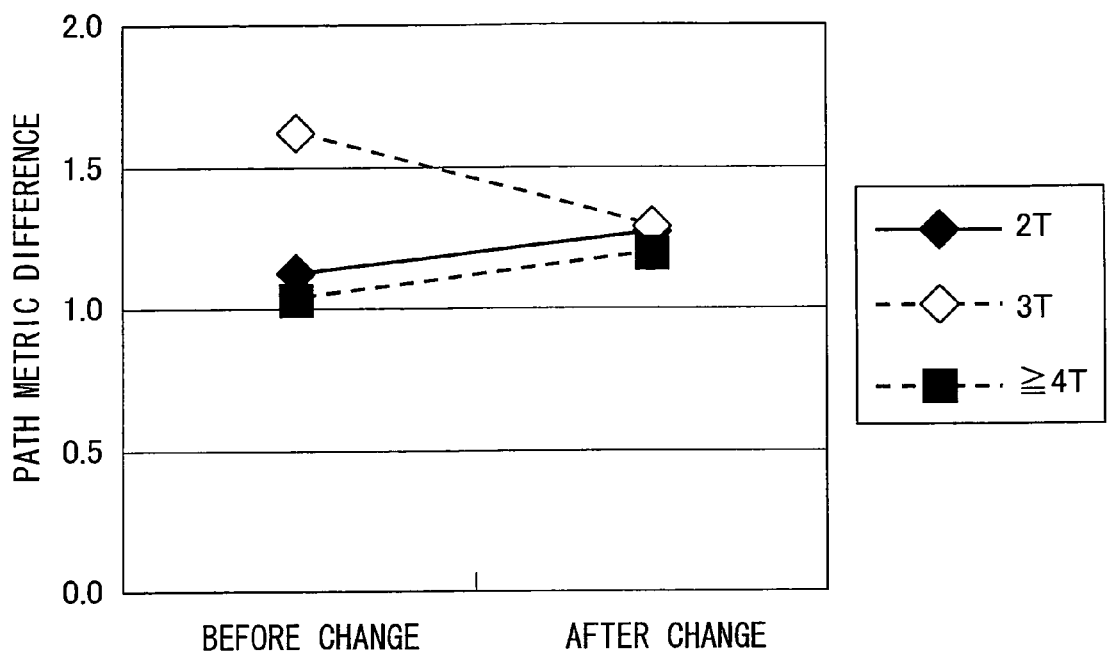
FIG. 8 illustrates evaluation of a reproduction signal.

"Before change" of FIG. 8 illustrates the by-recording-information path metric differences at a time when recordation is performed under a certain recording condition. At that time, the by-recording-information path metric difference $\Delta M13$ corresponding to a 3T mark is larger than other by-recording-information path metric differences. This indicates that the specific pattern "11000" is less likely to be mistaken for "11100,". Namely, this indicates that the end position of the recorded 3T mark is positioned forward from the standard position compared with the end positions of other mark lengths.

In order to move the end position of the recorded 3T mark backward, a last section pulse end position dTe, which is an element for changing a rear edge section of a recording mark, is changed backward.

Figure 9:
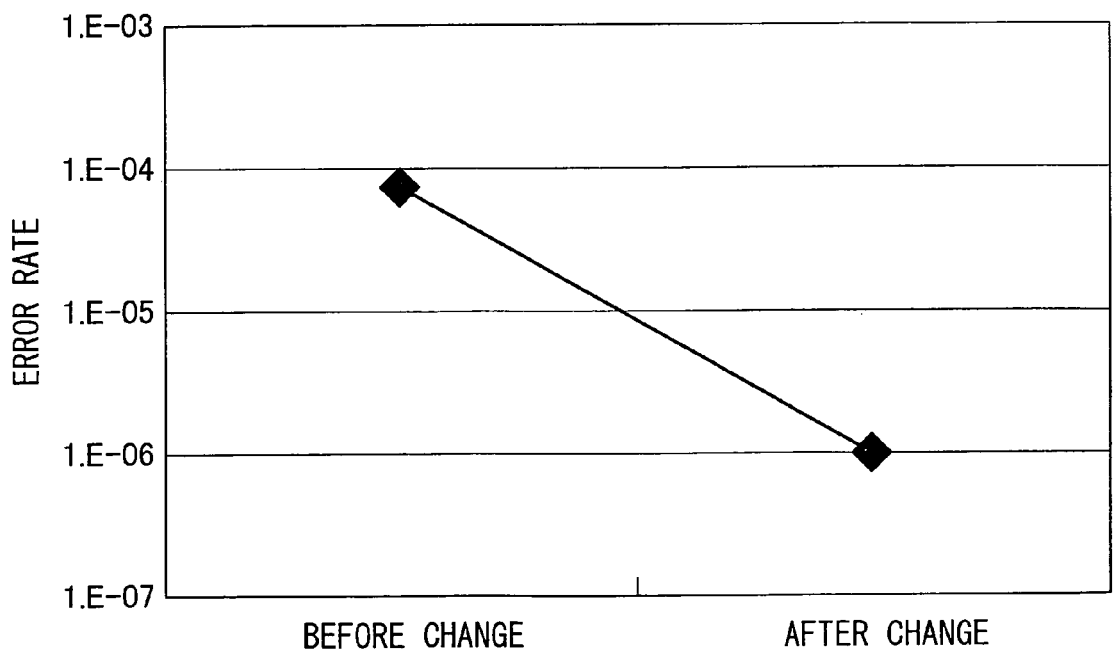
FIG. 9 illustrates evaluation of a reproduction signal.

"After change" of FIG. 8 illustrates by-recording-information path metric differences at a time when the by-recording-information path metric differences are stored under a recording condition after the change. FIG. 8 indicates that a difference among the by-recording-information path metric differences becomes smaller than that in "before change". FIG. 9 illustrates a change in an error rate in a recording domain before and after the change in a recording condition. FIG. 9 indicates that the error rate drops after the change in the recording condition.

These results indicate that: at a time when the specific pattern is "11000", when the recording condition is changed by using the by-recording-information path metric differences ΔM12, ΔM13, and ΔM14, a good recording state can be obtained.

Figure 10:
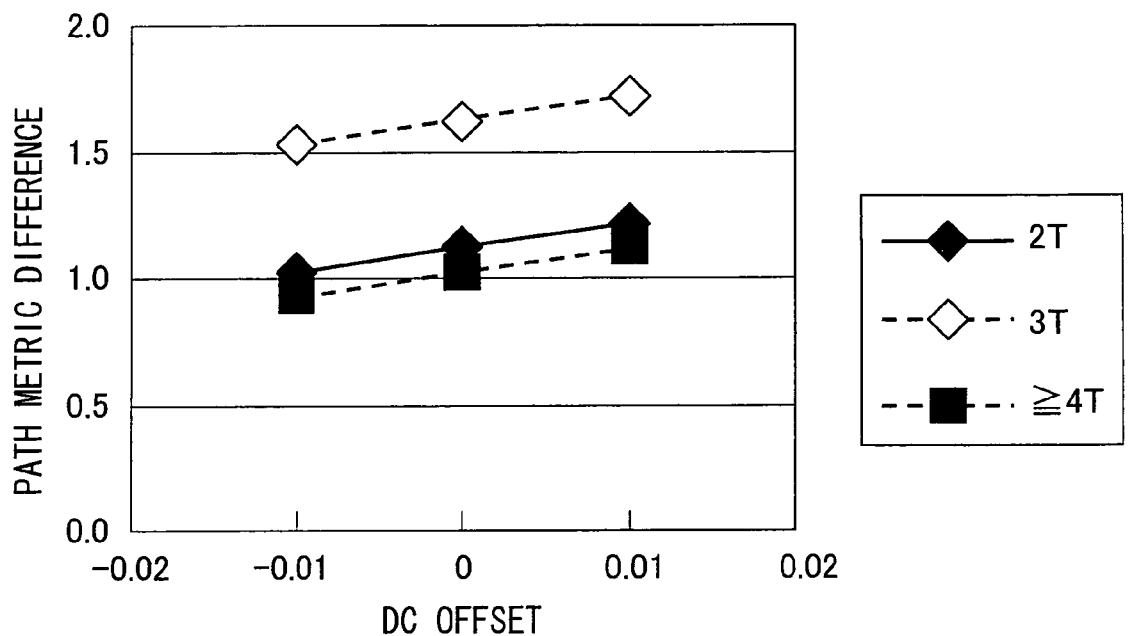
FIG. 10 illustrates evaluation of a reproduction signal.

FIG. 10 illustrates values of the by-recording-information path metric differences in a case where DC offsets are added to the reproduction signals obtained under the recording condition "before the change" in FIG. 8. The differences in the by-recording-information path metric differences hardly change relative to the values of the DC offsets. Therefore, it is possible to perform judgment for the change in the recording condition with little influence of the DC offsets.

Figure 11:
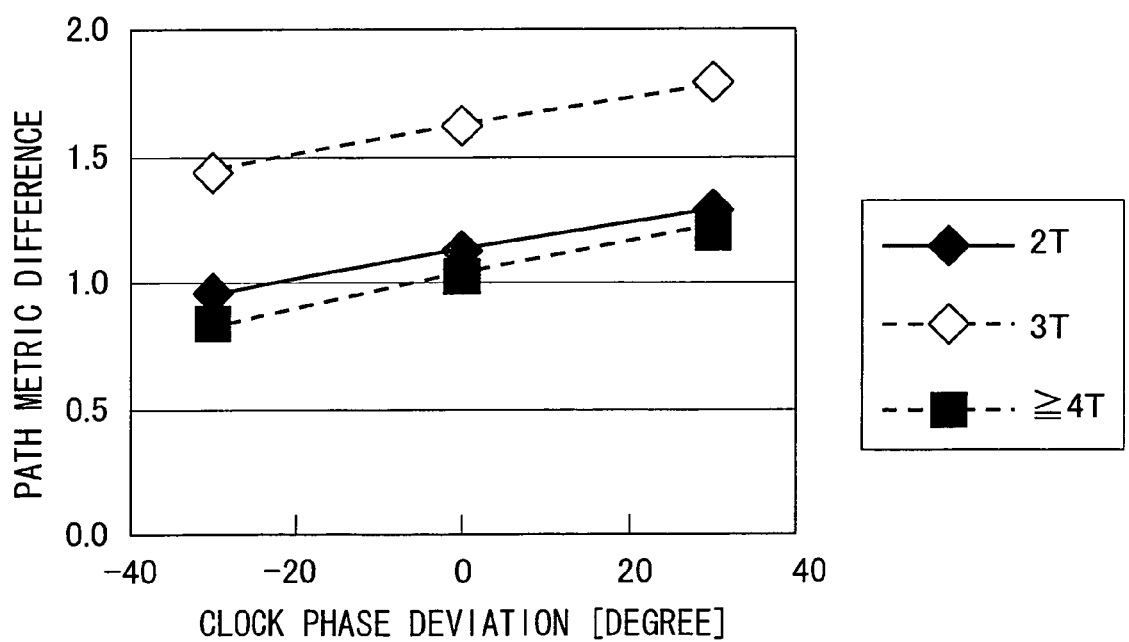
FIG. 11 illustrates evaluation of a reproduction signal.

FIG. 11 illustrates values of the by-recording-information path metric differences in a case where clock phase shifts are added to the reproduction signals obtained under the recording condition "before the change" in FIG. 8. The differences in the by-recording-information path metric differences hardly change relative to the values of the clock phase shifts. Therefore, it is possible to perform judgment for the change in the recording condition with little influence of the clock phase shifts.

Further, when "11100" is used as a specific pattern, the same effect can be obtained.

Figures 12, 13:
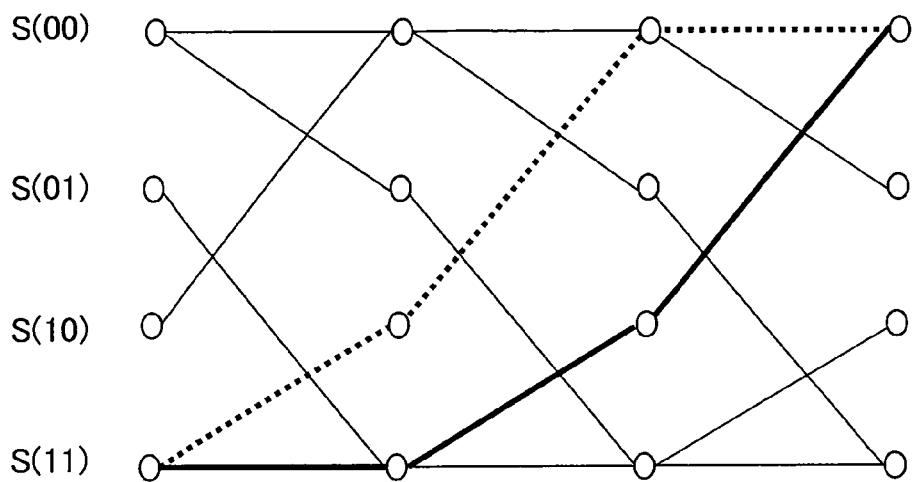
FIG. 12 is a trellis diagram used in Viterbi decoding.
FIG. 13 illustrates relations between decoded bit sequences corresponding to recording information and path metric differences with respect to the recording information.

FIG. 12 illustrates two paths under a correct state in a trellis diagram when the specific pattern is "11100". A thick full line indicates a correct path and a thick broken line indicates an error path. The SAM ideal value of the specific pattern is 1.5. FIG. 13 illustrates classification in which decoded bit sequences including the specific pattern "11100" are classified by recording information.

Figure 14:
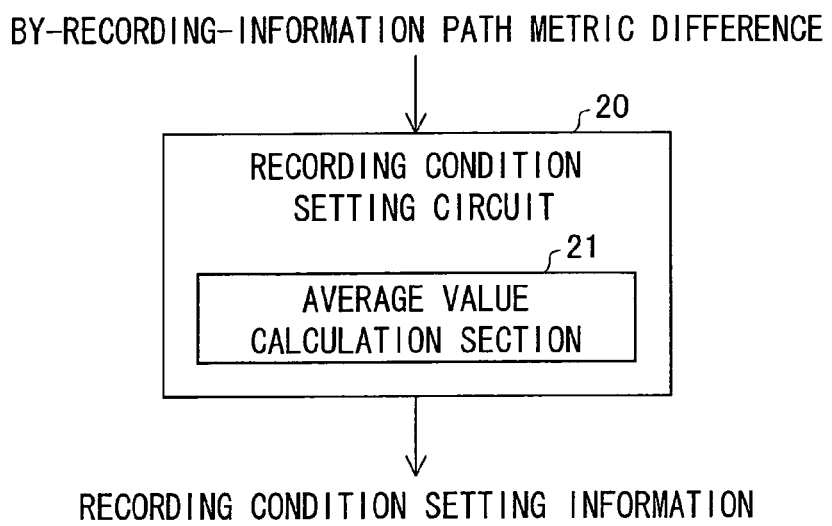
FIG. 14 is a block diagram schematically illustrating a recording condition set-up circuit provided in the optical disc device illustrated in FIG. 1.

"Which recording information corresponds to the decoded bit sequence including the specific pattern" is determined based on a coded bit sequence stored in the bit sequence register 9. Namely, when the decoded bit sequence including the specific pattern is "•011100" in the bit sequence register 9 (• may be either 0 or 1), the specific path metric difference at that time is regarded as the by-recording-information path metric difference ΔM23 corresponding to a 3T mark and stored in the memory (not shown). When the decoded bit sequence including the specific pattern is "•111100" (• may be either 0 or 1), the specific path metric difference at that time is regarded as the by-recording-information path metric difference ΔM24 corresponding to a 4T mark or more and stored in the memory (not shown). At that time, when a plurality of by-recording-information path metric differences are detected as the by-recording-information path metric differences ΔM23 and ΔM24 respectively, an average value of the by-recording-information path metric differences is calculated. At that time, as illustrated in FIG. 14, the recording condition setting circuit 20 should include an average value calculation section 21 for calculating the average value of the by-recording-information path metric differences when a plurality of by-recording-information path metric differences are detected as the by-recording-information path metric differences ΔM23 and ΔM24 respectively. Namely, the average value calculation section 21 calculates an average value of by-recording-information path metric differences in each group obtained through classification performed by the path metric difference classification circuit 10. The recording condition setting circuit 20 sets a recording condition based on the average value calculated by the average value calculation section 21.

Figure 15:
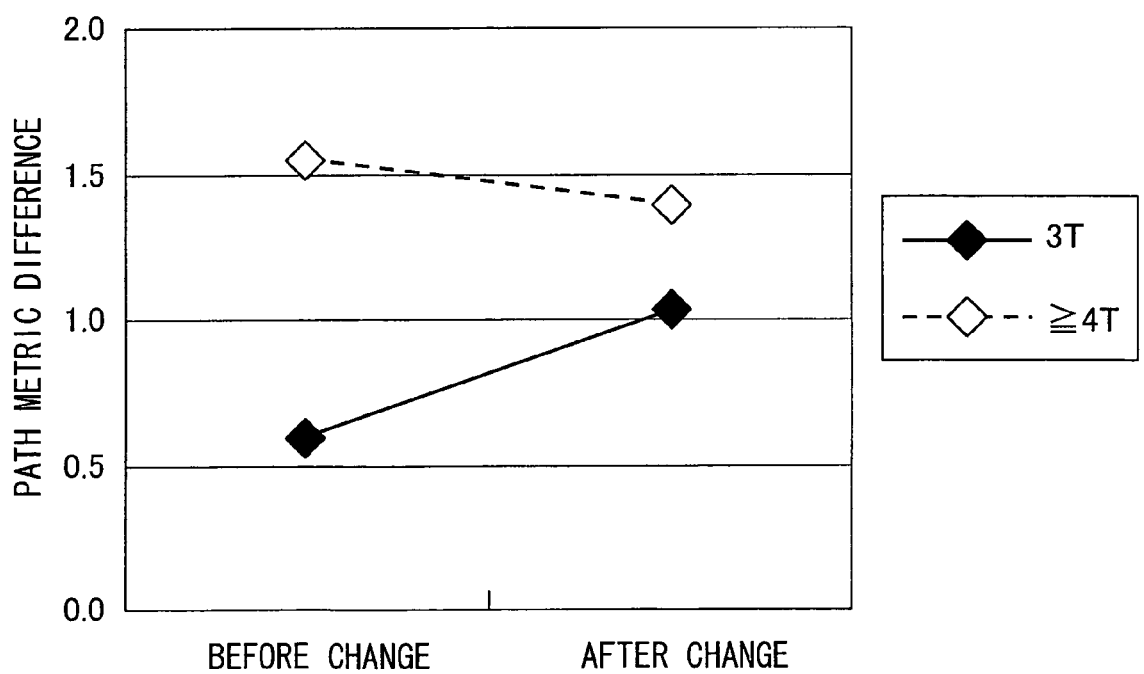
FIG. 15 illustrates evaluation of a reproduction signal.

FIG. 15 illustrates by-recording-information path metric differences under the same recording condition (before the change and after the change) as that of FIG. 8. At that time, a difference between the by-recording-information path metric difference ΔM23 corresponding to the 3T mark and the by-recording-information path metric difference ΔM24 corresponding to the 4T mark or more becomes small after the change. These results indicate that: in a case where a specific pattern is "11100", when the values of the by-recording-information path metric differences ΔM23 and ΔM24 are used, it is possible to change the recording condition as with when the specific pattern is "11000" and to obtain a good recording state. Note that it is possible to obtain the same effect by changing the recording condition not only by using either the specific pattern "11000" or "11100" but also both of the specific patterns.

The following explains a change in the recording condition using the by-recording-information path metric differences ΔM32, ΔM33, and ΔM34 when "00011" is used as other example of the specific pattern.

Figures 16, 17:
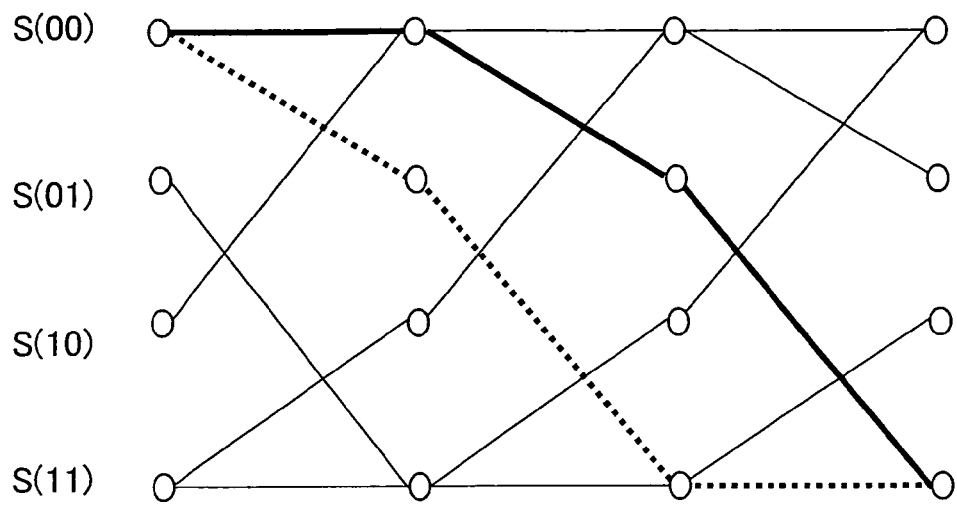
FIG. 16 is a trellis diagram used in Viterbi decoding.
FIG. 17 illustrates relations between decoded bit sequences corresponding to recording information and path metric differences with respect to the recording information.

FIG. 16 illustrates two paths under a correct state in a trellis diagram when the specific pattern is "00011". A thick full line indicates a correct path and a thick broken line indicates an error path. The SAM ideal value of the specific pattern is 1.5. FIG. 17 illustrates classification in which decoded bit sequences including the specific pattern "00011," are classified by recording information.

"Which recording information corresponds to the decoded bit sequence including the specific pattern" is determined based on a coded bit sequence stored in the bit sequence register 9. Namely, when the decoded bit sequence including the specific pattern is "000110•" in the bit sequence register 9 (• may be either 0 or 1), the specific path metric difference at that time is regarded as the by-recording-information path metric difference ΔM32 corresponding to a 2T mark and stored in the memory (not shown). Namely, the specific pattern "00011" is detected, the specific path metric value at that time is stored in the memory (not shown), a decoded bit sequence after the specific pattern is referred to, a mark length is determined, and then classification into the by-recording-information path metric differences is performed. When the decoded bit sequence including the specific pattern is "0001110•" or "00011110•" in the bit sequence register 9 (• may be either 0 or 1), the specific path metric difference at that time is regarded as the by-recording-information path metric difference ΔM33 or ΔM34 corresponding to a 3T mark or a 4T mark or more, respectively, and is stored in the memory (not shown). At that time, when a plurality of by-recording-information path metric differences are detected as the by-recording-information path metric differences ΔM33 and ΔM34 respectively, an average value of the by-recording-information path metric differences is calculated.

Figure 18:
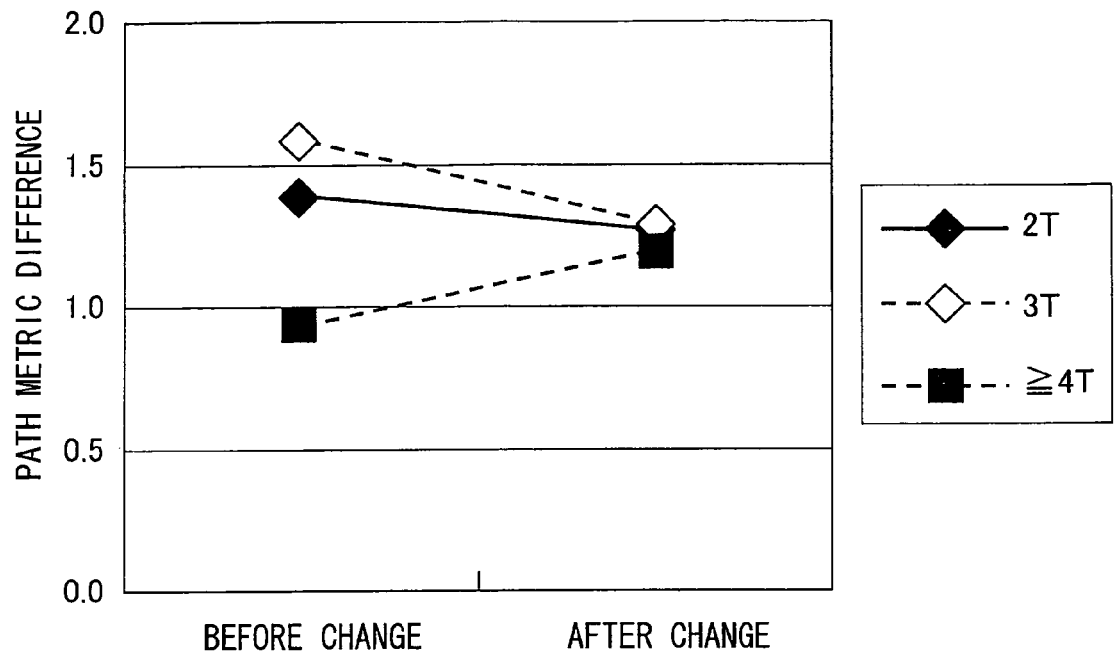
FIG. 18 illustrates evaluation of a reproduction signal.

"Before change" of FIG. 18 illustrates the by-recording-information path metric differences at a time when recordation is performed under a certain recording condition. At that time, the by-recording-information path metric difference $\Delta M34$ corresponding to a 4T mark or more is smaller than other by-recording-information path metric differences. This indicates that the specific pattern "00011" is likely to be mistaken for "00111". Namely, this indicates that the start position of the recorded 4T mark or more is positioned forward from the standard position compared with the start positions of 2T mark and 3T mark. Therefore, in order to move the start position of the recorded 4T mark or more backward, a top section pulse start position dTop, which is an element for changing a front edge section of a recording mark, is changed backward.

"After change" of FIG. 18 illustrates the by-recording-information path metric differences at a time when the by-recording-information path metric differences are recorded under the recording condition after the change. The difference between the by-recording-information path metric differences is smaller than that "before change".

Figure 19:
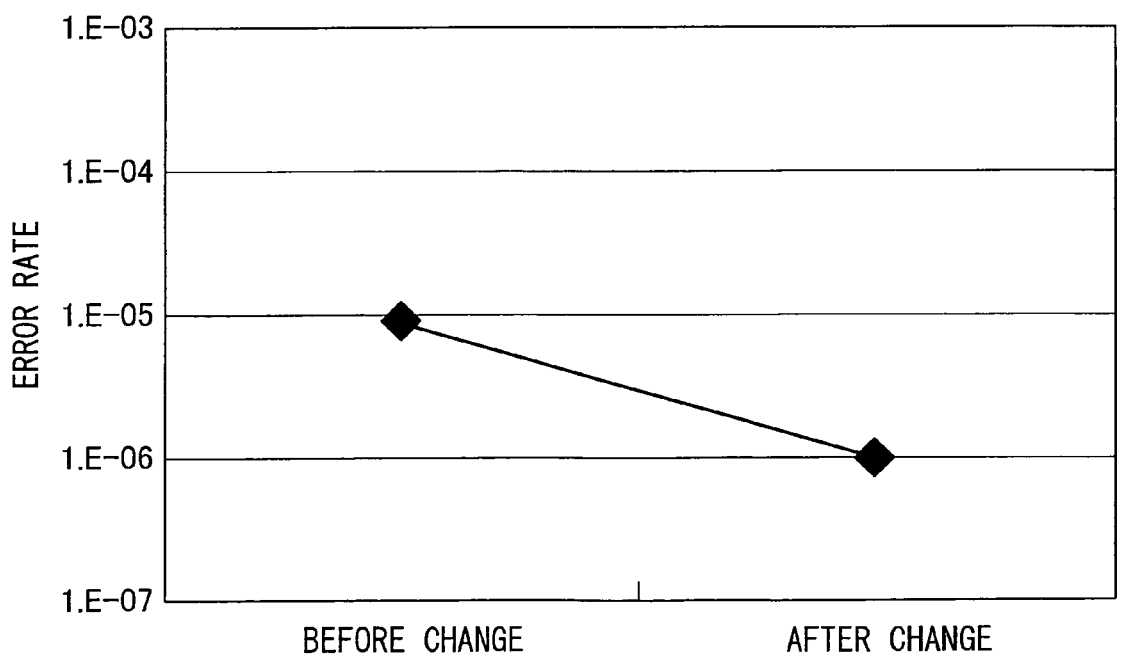
FIG. 19 illustrates evaluation of a reproduction signal.

FIG. 19 illustrates a change in an error rate of the recording domain before and after the change in the recording condition. FIG. 19 indicates that the error rate drops after the change in the recording condition. These results indicate that: in a case where the specific pattern is "00011", when the recording condition is changed by using the values of the by-recording-information path metric differences $\Delta M32$, $\Delta M33$, and $\Delta M34$, a good recording state can be obtained.

Further, when "00111" is used as the specific pattern, the same effect can be obtained.

Figures 20, 21:
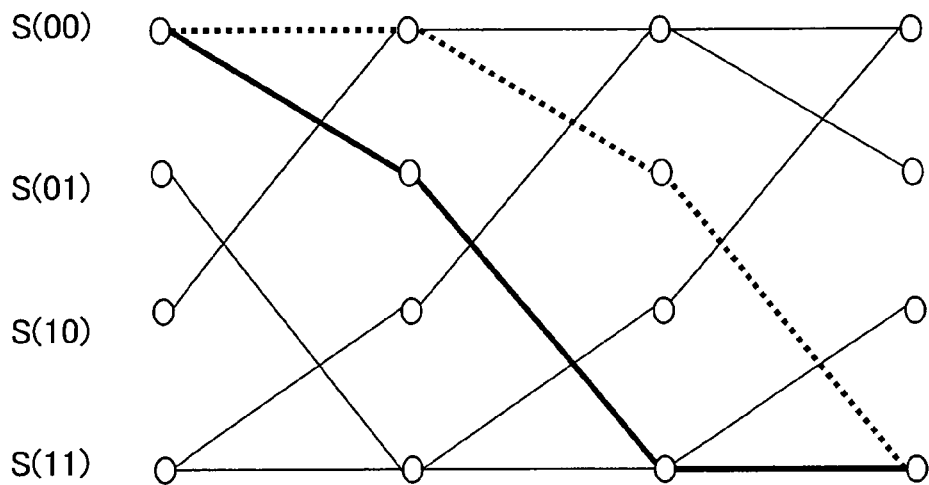
FIG. 20 is a trellis diagram used in Viterbi decoding.
FIG. 21 illustrates relations between decoded bit sequences corresponding to recording information and path metric differences with respect to the recording information.

FIG. 20 illustrates two paths under a correct state in the trellis diagram when the specific pattern is "00111". A thick full line indicates a correct path and a thick broken line indicates an error path. The SAM ideal value of the specific pattern is 1.5. FIG. 21 illustrates classification in which decoded bit sequences including the specific pattern "00111," are classified by recording information.

"Which recording information corresponds to the decoded bit sequence including the specific pattern" is determined based on a coded bit sequence stored in the bit sequence register 9. Namely, when the decoded bit sequence including the specific pattern is "001110•" in the bit sequence register 9 (• may be either 0 or 1), the specific path metric difference at that time is regarded as the by-recording-information path metric difference $\Delta M43$ corresponding to a 3T mark and stored in the memory (not shown). When the decoded bit sequence including the specific pattern is "00111•" (• may be either 0 or 1), the specific path metric difference at that time is regarded as the by-recording-information path metric difference $\Delta M44$ corresponding to a 4T mark or more and stored in the memory (not shown). At that time, when a plurality of by-recording-information path metric differences are detected as the by-recording-information path metric differences $\Delta M43$ and $\Delta M44$ respectively, an average value of the by-recording-information path metric differences is calculated.

Figure 22:
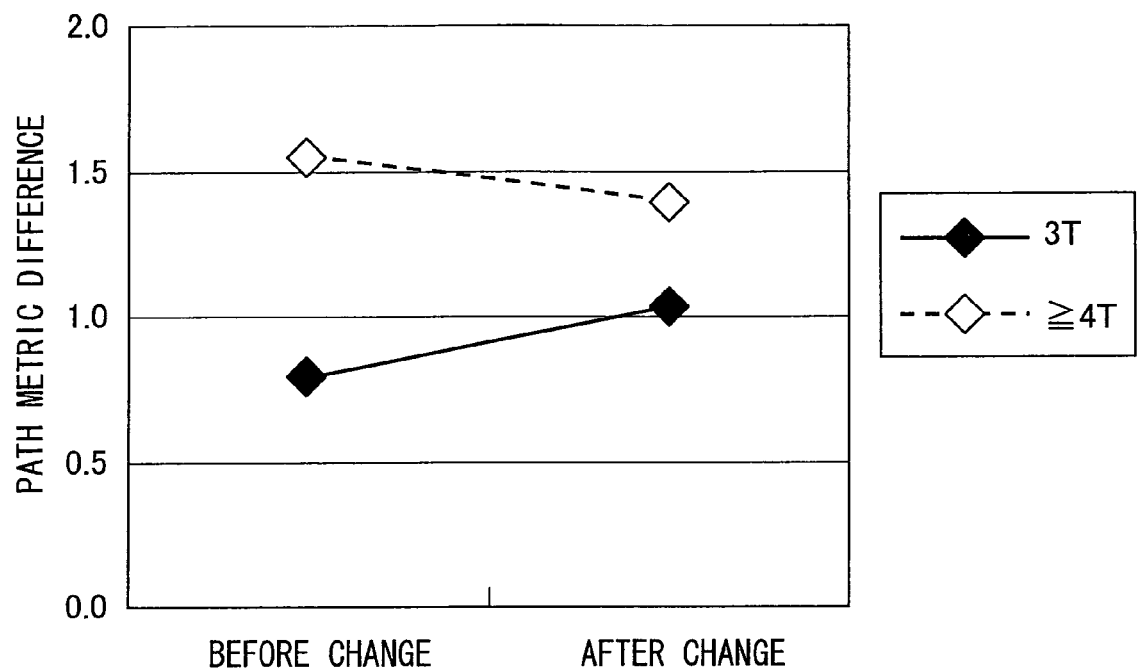
FIG. 22 illustrates evaluation of a reproduction signal.

FIG. 22 illustrates by-recording-information path metric differences under the same recording conditions (before the change and after the change) as those of FIG. 18. At that time, a difference between the by-recording-information path metric difference $\Delta M43$ corresponding to the 3T mark and the by-recording-information path metric difference $\Delta M44$ corresponding to the 4T mark or more becomes small after the change. These results indicate that: in a case where a specific pattern is "00111", when the values of the by-recording-information path metric differences $\Delta M43$ and $\Delta M44$ are used, it is possible to change the recording condition and to obtain a good recording state as with when the specific pattern is "00011". Note that it is possible to obtain the same effect by changing the recording condition not only by using either the specific pattern "00011" or "00111" but also both of the specific patterns.

Further, when the recording condition is changed by using all the results of "11000", "11100", "00011", and "00111" as the specific patterns, good recording conditions can be obtained as with the above.

As described above, in the optical disc device, the specific path metric differences are classified by recording information and the values of the specific path metric differences having been classified are compared, so that edge deviation of a recording mark is detected without an influence from a DC offset or a clock phase deviation. By changing a recording condition based on the detection of the edge deviation of the recording mark, it is possible to obtain a good recording state.

Further, the present invention is explained above by using the difference among the average value of the by-recording-information path metric differences classified in the path metric difference classification circuit 10. However, the present invention is not limited to this. When the frequency of each of the by-recording-information path metric differences is counted according to the value, the frequency of each of the by-recording-information path metric differences is indicated by a histogram (distribution). By causing thus formed distributions of the by-recording-information path metric differences to be similar to each other, it is possible to obtain the same effect as when the difference in the average value of the by-recording-information path metric differences is small. Further, when a distribution of the by-recording-information path metric differences is within a predetermined value, it is possible to obtain the same effect as when the average value of the by-recording-information path metric differences is within a predetermined value.

Figure 23:
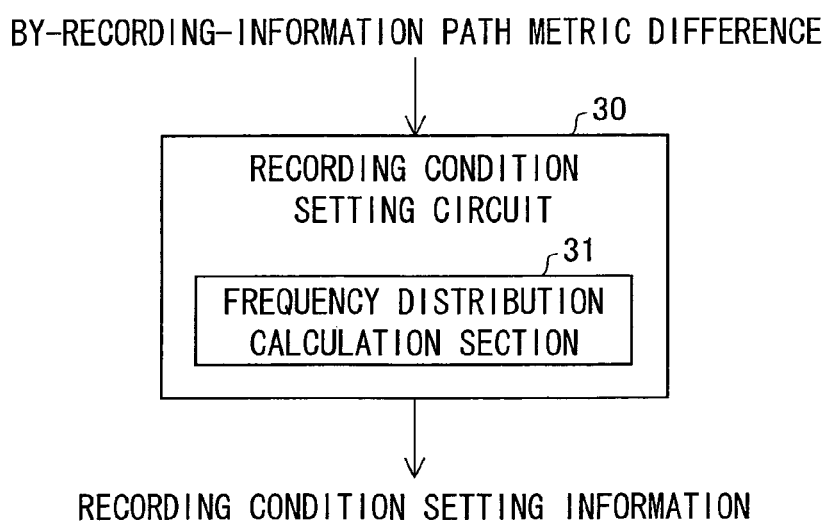
FIG. 23 is a block diagram schematically illustrating a recording condition set-up circuit provided in the optical disc device illustrated in FIG. 1.

At that time, it is possible to use the recording condition setting circuit 30 illustrated in FIG. 23. Namely, the recording condition setting circuit 30 includes a frequency distribution calculation section 31 for calculating frequency distribution with respect to each group of by-recording-information path metric differences obtained through classification performed by the path metric difference classification circuit 10 and sets the recording condition so that frequency distributions calculated by the frequency distribution calculation section 31 are in proximity to each other among recording information.

Further, the change in the recording condition by using the difference among the by-recording-information path metric differences $\Delta M12$, $\Delta M13$, and $\Delta M14$ classified by the path metric difference classification circuit 10 is explained above. However, the present invention may be arranged so that a predetermined range for determining whether or not to change the recording condition is set based on the average value of the specific path metric differences as a standard.

The following explains how to set the predetermined range by using the values of the by-recording-information path metric differences $\Delta M12$, $\Delta M13$, and $\Delta M14$ when the particular pattern is "11000".

Figure 24:
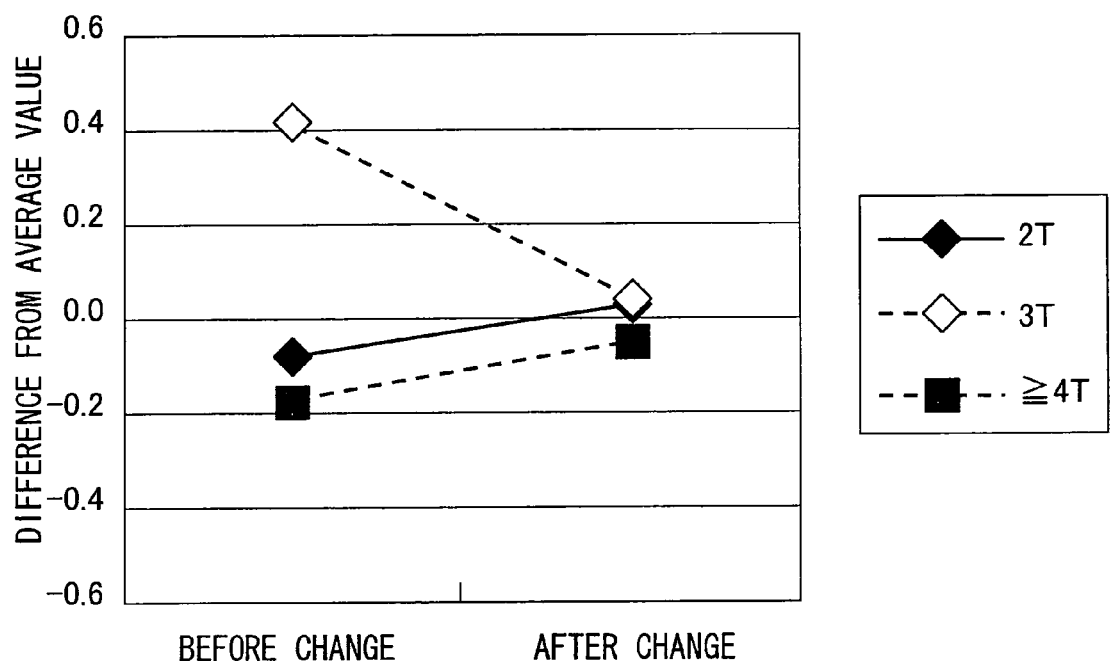
FIG. 24 illustrates evaluation of a reproduction signal.

FIG. 24 illustrates a result of calculating the difference between values of the by-recording-information path metric differences $\Delta M12$, $\Delta M13$, and $\Delta M14$ and the average value of the path metric differences corresponding to the specific pattern "11000". At that time, the difference between the by-recording-information path metric difference $\Delta M13$ corresponding to a 3T mark and the average value becomes small after the change, and the differences between all the by-recording-information path metric differences and the average value become small. Namely, it is determined, based on the predetermined range, whether all the by-recording-information path metric differences become in proximity to the average value. Based on the determination, the recording condition is changed, thereby obtaining a good recording state.

Figure 25:
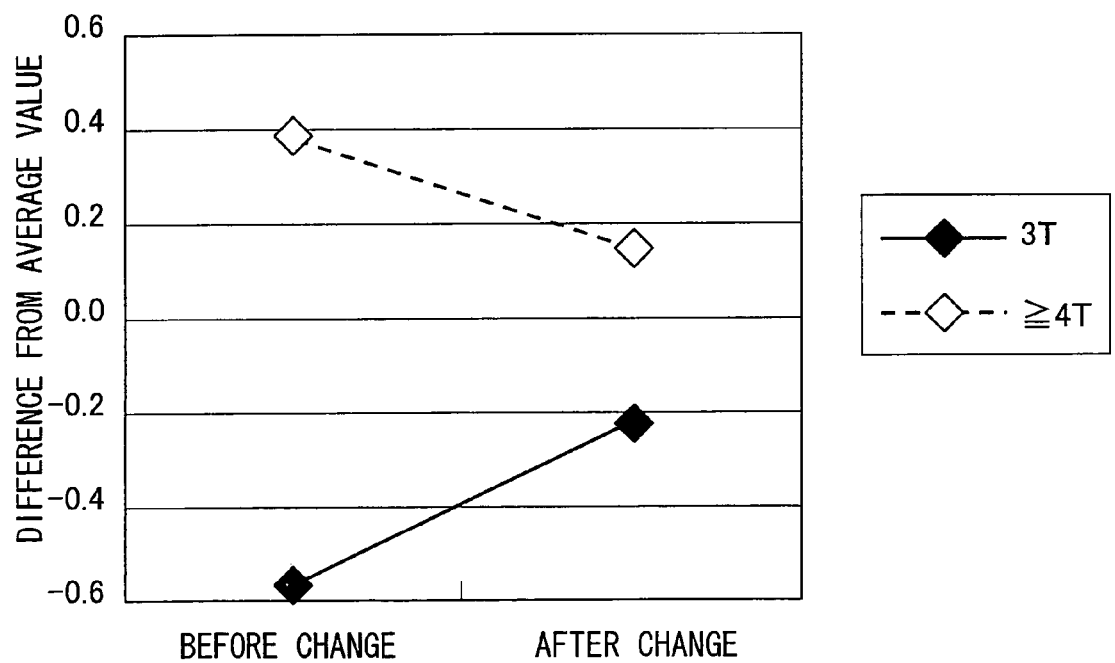
FIG. 25 illustrates evaluation of a reproduction signal.
Figure 26:
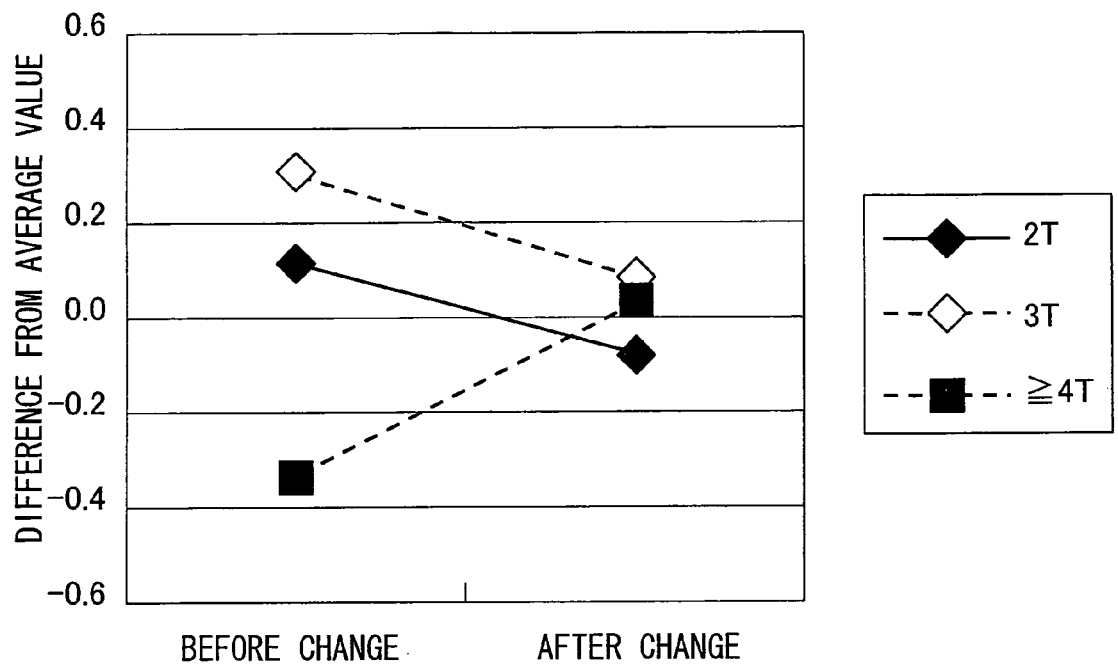
FIG. 26 illustrates evaluation of a reproduction signal.
Figure 27:
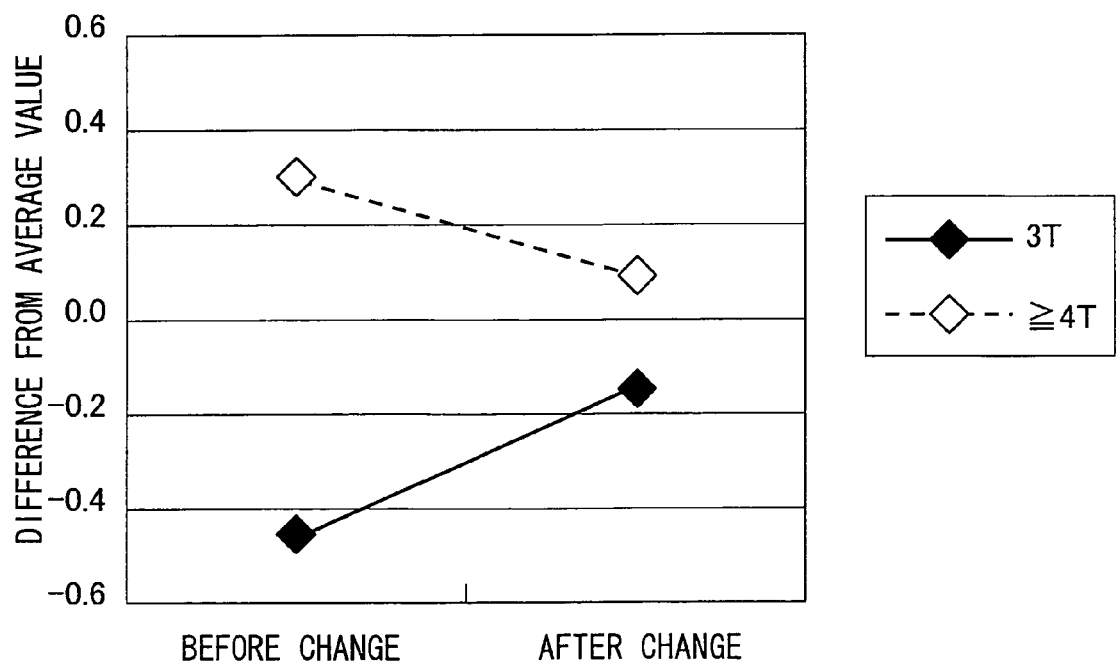
FIG. 27 illustrates evaluation of a reproduction signal.

FIG. 25 illustrates the result of calculating the difference between the values of the by-recording-information path metric differences ΔM23 and ΔM24 and the average value of the path metric differences corresponding to the specific pattern "11100" under the same recording conditions (before the change and after the change) as FIG. 15. Further, FIG. 26 illustrates the result of calculating the difference between the values of the by-recording-information path metric differences ΔM32, ΔM33, and ΔM34 and the average value of the path metric differences corresponding to the specific pattern "00011" under the same recording conditions (before the change and the after the change) as FIG. 20. Further, FIG. 27 illustrates the result of calculating the difference between the by-recording-information path metric differences ΔM43 and ΔM44 and the average value of the path metric differences corresponding to the specific pattern "00111" under the same recording conditions (before the change and after the change) as FIG. 22. When "11100", "00011", or "00111" is used as the specific pattern, it is possible to obtain the same effect as when "11000" is used as the specific pattern.

Further, when the recording condition is changed by using all the results of "11000", "11100", "00011", and 100111, as the specific patterns, good recording conditions can be obtained as with the above.

Further, when "11100" or "00111" are used as the specific pattern, 2T does not exist and only 3T or more exists in the by-recording-information path metric differences. When "11000" or "00011" is used as the specific pattern, 2T exists in the by-recording-information path metric difference. However, even when 3T or more out of the specific path metric differences are extracted and the average value of the extracted path metric differences is calculated so as to maintain the same standard as in using the specific pattern "11100" or "00111", namely, even when the average value of a plurality of by-recording-information path metric differences is calculated, the same good recording condition as the above can be obtained.

Unless the recording power condition (recording power, deletion power, and bias power) illustrated in FIG. 2, or at least the recording power is set to a suitable value, there is a case where extreme shortage of record or extreme excess of record occurs and a good recording state is not obtained, with a result that it is impossible to extract a reproduction clock in the reproduction clock extraction circuit illustrated in FIG. 1. Therefore, it is necessary that the recording power is in a good condition under which the reproduction clock can be extracted. An embodiment 2 as indicated below describes an example of specifying the recording power condition.

Embodiment 2

Another embodiment of the present invention is explained below with reference to FIG. 28. Note that the present embodiment is different from the embodiment 1 in that: the former specifies how the recording power condition out of the recording conditions is set. However, the present embodiment is similar to the embodiment 1 except for the difference. Therefore, for convenience of explanation, members having the same functions as those illustrated in figures of the embodiment 1 are given the same reference numerals and explanations thereof are omitted here.

Figure 28:
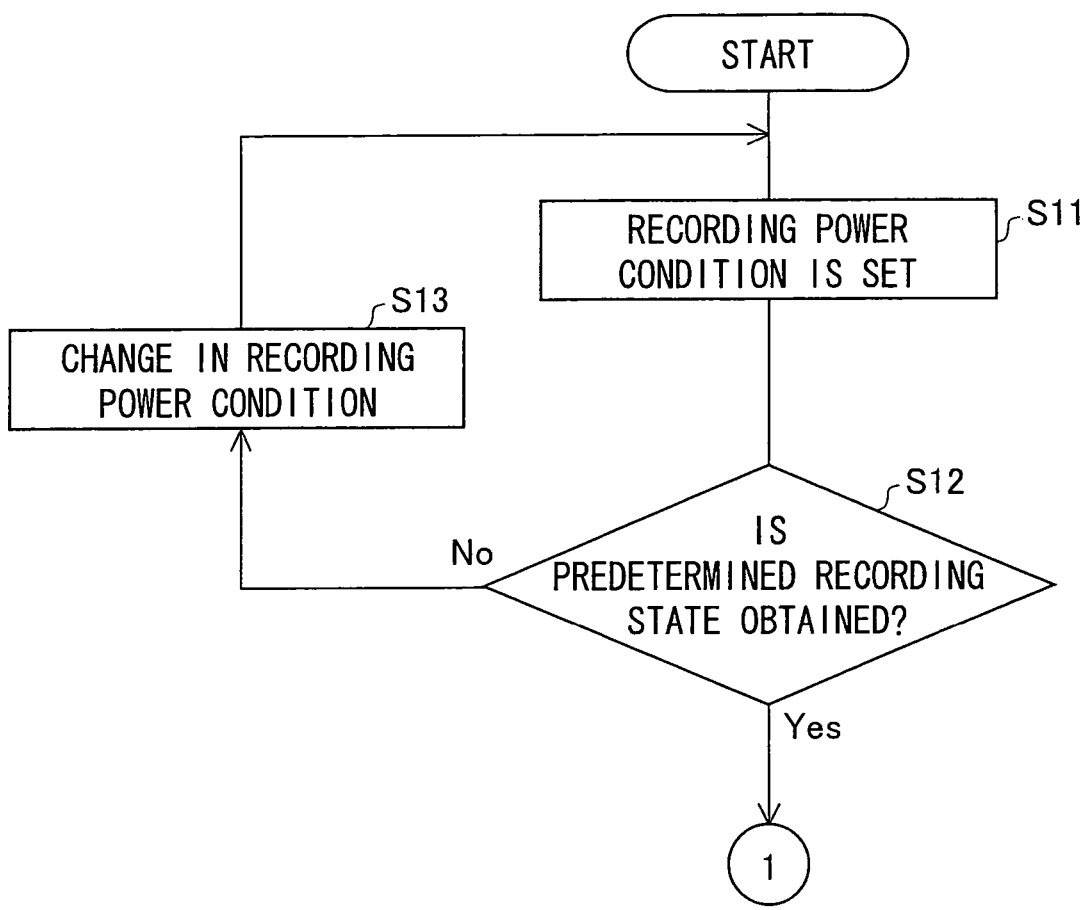
FIG. 28 is a flowchart illustrating how a reproduction operation is performed by the optical disc device illustrated in FIG. 1.

With reference to a flowchart illustrated in FIG. 28, the following explains how the recording power condition is set.

First, a recording power condition is set (step S11).

Next, a recording state is determined (step S12).

Here, in determining the recording state, the determination may be performed based on whether or not a reproduction clock can be extracted, or the determination may be performed in such a manner that: jitter or an error rate which is normally used as an indicator for evaluating a reproduction signal is obtained from a reproduction signal of a recorded track and the determination is performed based on the value of the jitter or the error rate.

Figure 4:
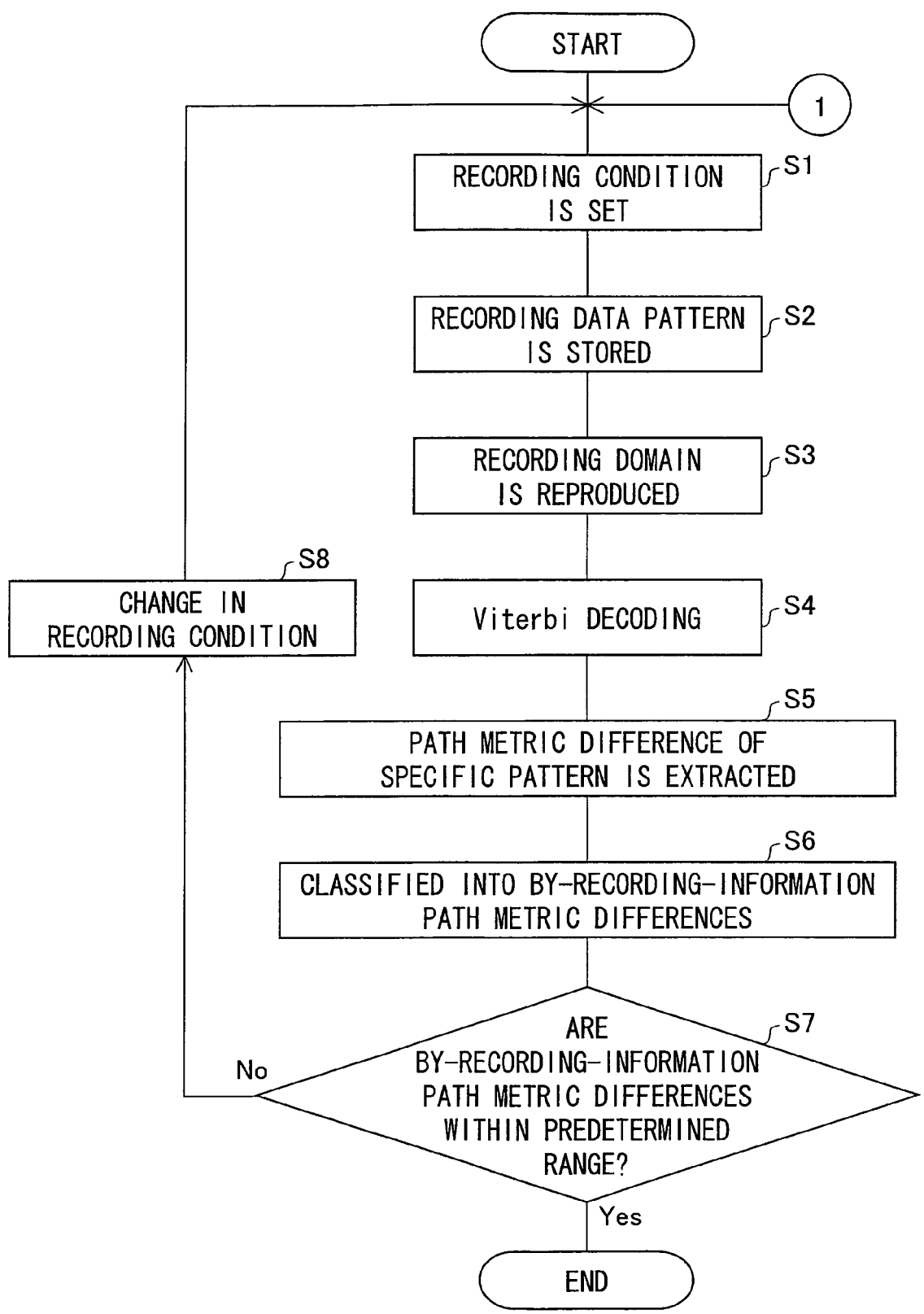
FIG. 4 is a flowchart illustrating how a reproduction operation of the optical disc device illustrated in FIG. 1 is performed.

When a predetermined recording state can be obtained in the step S12, the process goes to step S1 in FIG. 4.

On the other hand, when a predetermined recording state cannot be obtained, the recording power condition is changed (step S13), and the process goes back to step S11.

As described above, in the present embodiment, it is possible to obtain a good recording state by further changing the recording power condition of the optical disc device.

When the recording power is changed and a mark is stored, there is a case where the amplitude of the reproduction signal from the recording domain varies according to the size of a recorded mark. Namely, the smaller the recording power is, the smaller the amplitude of the reproduction signal of the recorded mark is. On the other hand, the larger the recording power is, the larger the amplitude of the reproduction signal of the recorded mark is. Namely, even when the value of the amplitude gain of the reproduction signal is fixed in the A/D converter 5 and the like in FIG. 1, some recording marks result in the same effect as when the amplitude gain is changed. The same can be said about a case where the amplitude gain itself is changed.

Therefore, an embodiment 3 as indicated below describes a method that allows for reproduction with high accuracy even when the amplitude gain of the reproduction signal varies in the A/D converter 5 in FIG. 1 and the like.

Embodiment 3

Further embodiment of the present invention is explained below with reference to FIGS. 29 through 31. Note that the present embodiment is similar to the embodiments 1 and 2 except for the below-indicated arrangement. Therefore, for convenience of explanation, members having the same functions as those illustrated in figures of the embodiments 1 and 2 are given the same reference numerals and explanations thereof are omitted here.

Figure 29:
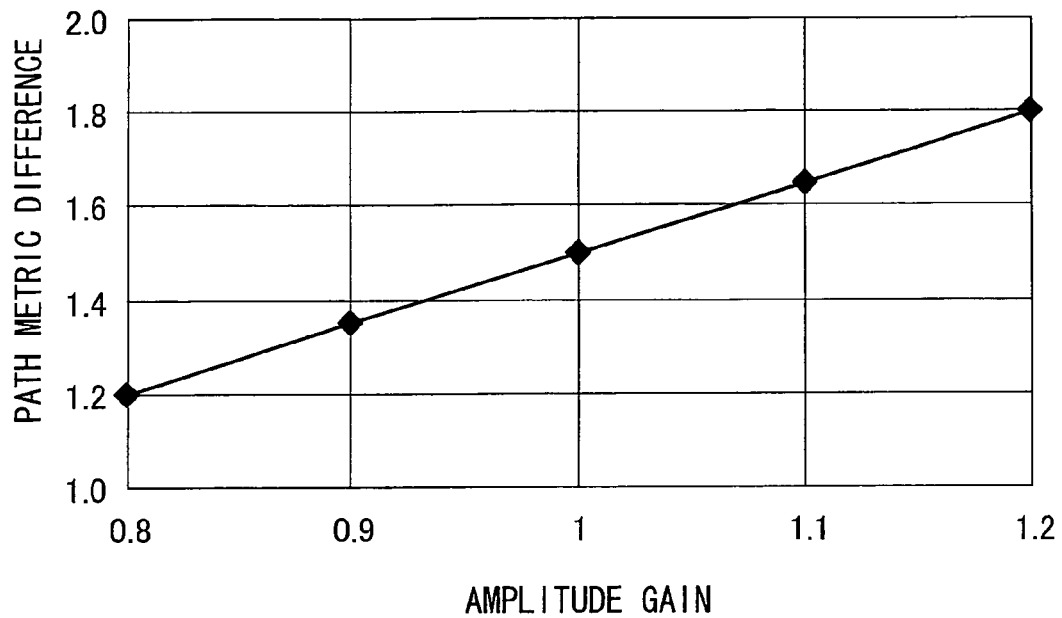
FIG. 29 illustrates a state in which an amplitude gain is given to a reproduction signal.

FIG. 29 illustrates a change in a path metric difference corresponding to a specific pattern "11000" when an amplitude gain is given to an ideal waveform. The path metric difference (SAM) is obtained by multiplying an ideal value 1.5 by an amplitude gain. Note that when a specific pattern is set to "11100", "00111", or "00011", a change in the path metric difference is substantially the same as the change when the specific pattern is set to "11000".

Figure 30:
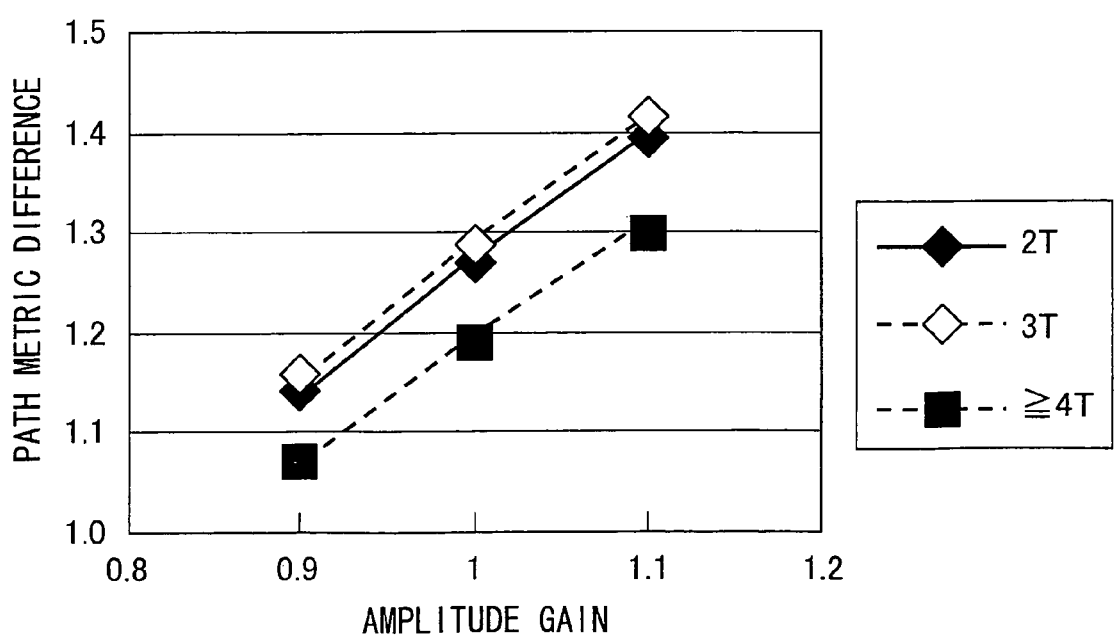
FIG. 30 illustrates evaluation of a reproduction signal.
Figure 31:
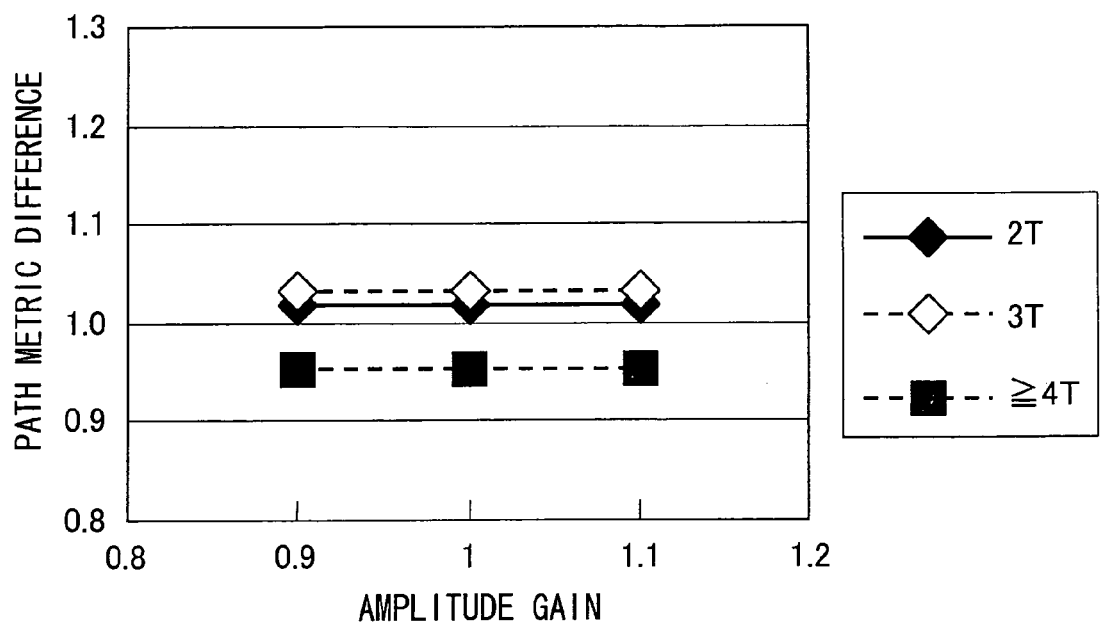
FIG. 31 illustrates evaluation of a reproduction signal.

Next, FIG. 30 illustrates a change in the by-recording-information path metric differences in a case where the amplitude of the reproduction signal under the recording condition "after the change" of FIG. 8 is changed. FIG. 30 indicates that the values of the by-recording-information path metric differences change according to the amplitude gains. Therefore, each by-recording-information path metric difference is divided by the average value of the path metric differences corresponding to the specific pattern "11000", namely, the by-recording-information path metric differences are normalized, so that the influence of the amplitude gains are reduced. FIG. 31 illustrates by-recording-information path metric differences after normalization. FIG. 31 indicates that values of the by-recording-information path metric differences are not influenced by a change in the amplitude gain and maintain substantially constant values.

Figure 32:
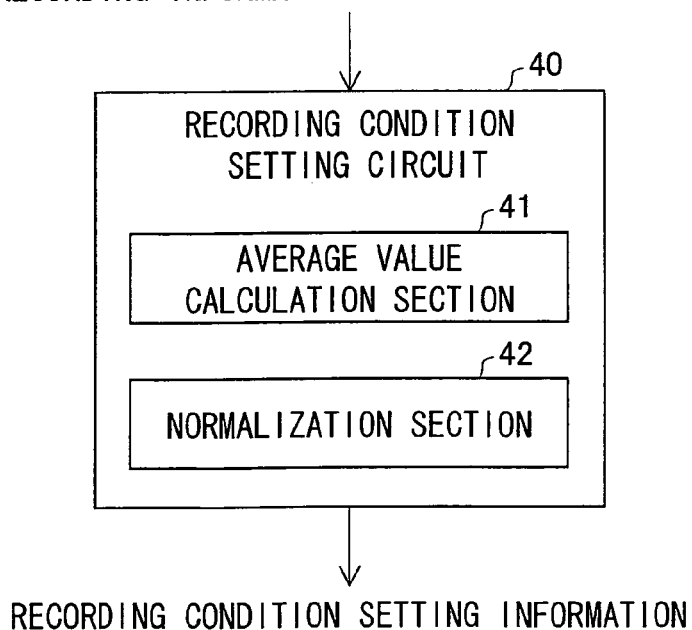
FIG. 32 is a block diagram schematically illustrating a recording condition set-up circuit provided in the optical disc device illustrated in FIG. 1.

Therefore, even when the amplitude gain changes, it is possible to change a current recording condition into a recording condition with higher accuracy or to set a recording condition with higher accuracy by using the by-recording-information path metric differences after normalization. As a result, a good recording state can be obtained. This can be realized by, for example, the recording condition setting circuit 40 illustrated in FIG. 32. Namely, the recording condition setting circuit 40 illustrated in FIG. 32 is substantially the same as the recording condition setting circuit 20 illustrated in FIG. 13 except that the former has a normalization section 42 for normalizing the by-recording-information path metric differences based on an average value obtained by an average value calculation section 41 (corresponding to the average value calculation section 21 in FIG. 13).

Namely, the recording condition setting circuit 40 sets the recording condition based on values obtained by normalizing the by-recording-information path metric differences by the normalization section 42.

Note that the present embodiment explains, as an example, the result of dividing each by-recording-information path metric difference by the path metric difference corresponding to the specific pattern "11000". However, the same effect can be obtained by using not only the specific pattern "11000" but also at least one of "11000", "11100", "00011", and "00111". For example, the same effect can be obtained by using the average value of the path metric difference corresponding to specific patterns "11000", "11100", "00011", and "00111".

The embodiments do not limit the scope of the present invention and a variety of modifications are possible within the scope of the present invention.

Figure 33:
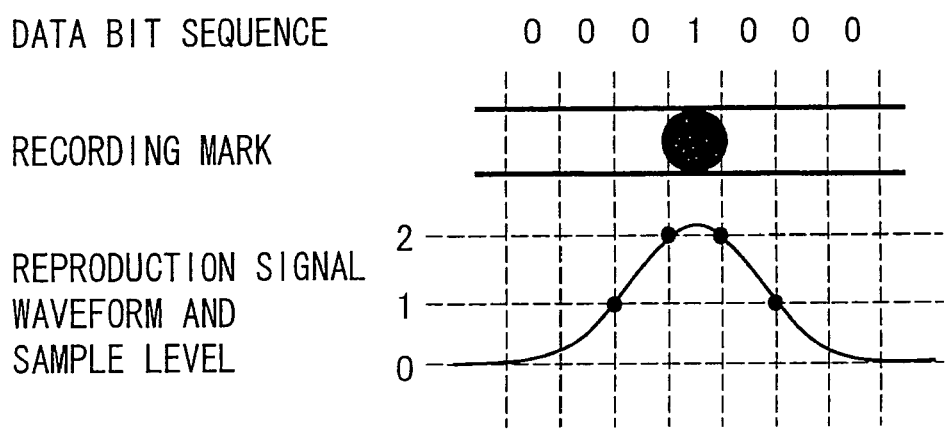
FIG. 33 is a schematic illustrating a reproduction signal waveform according to PR(1, 2, 2, 1) properties.

For example, each of the embodiments explains, as an example, a case where PRML detection is performed based on PR (1, 2, 1) properties. However, the present invention is not limited to this case. As shown in FIG. 33, a reproduction signal waveform of an ideal 1T mark free from any distortion or noise in accordance with PR (1,2,2,1) properties has a 1:2:2:1 level ratio of samples for a channel clock. For a reproduction signal waveform from a 2T mark or more, the level ratio is obtainable from the superimposition of the reproduction waveform of a 1T mark. For example, the sample level ratio is 1:3:4:3:1 for the one with a 2T mark, 1:3:5:5:3:1 for the one with a 3T mark, and 1:3:5:6:5:3:1 for the one with a 4T mark. An ideal reproduction signal waveform can be assumed for any given bit sequence. There are seven ideal sample levels (ideal sample levels): 0, 1, 2, 3, 4, 5 and 6.

Figure 34:
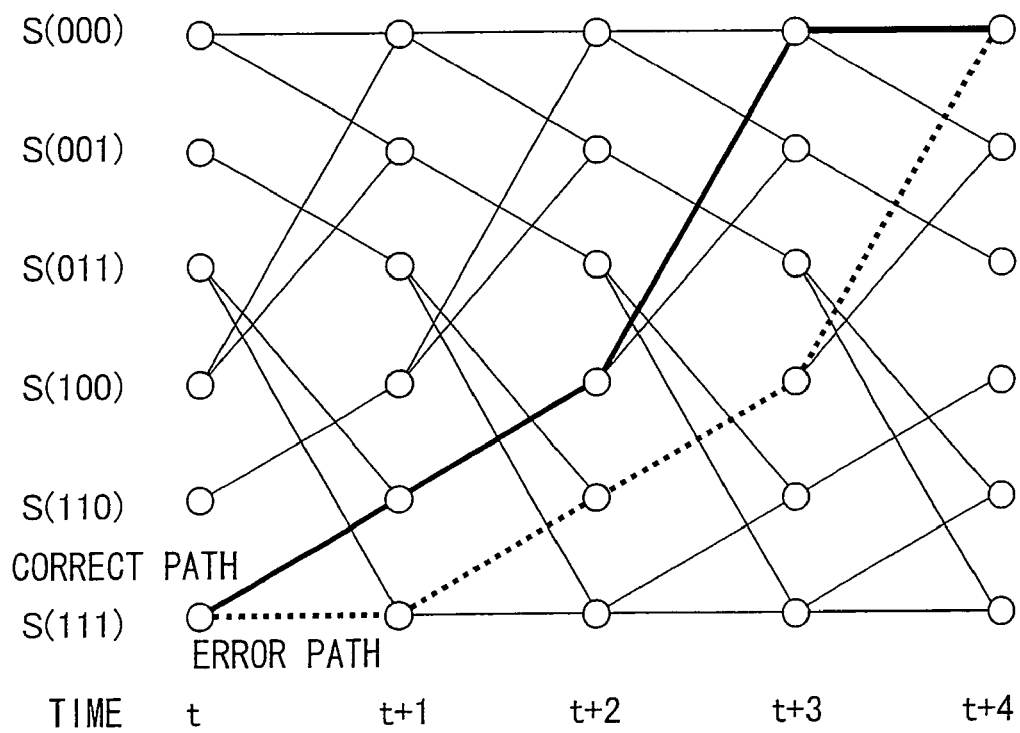
FIG. 34 is a trellis diagram used in Viterbi decoding.
Figure 35:
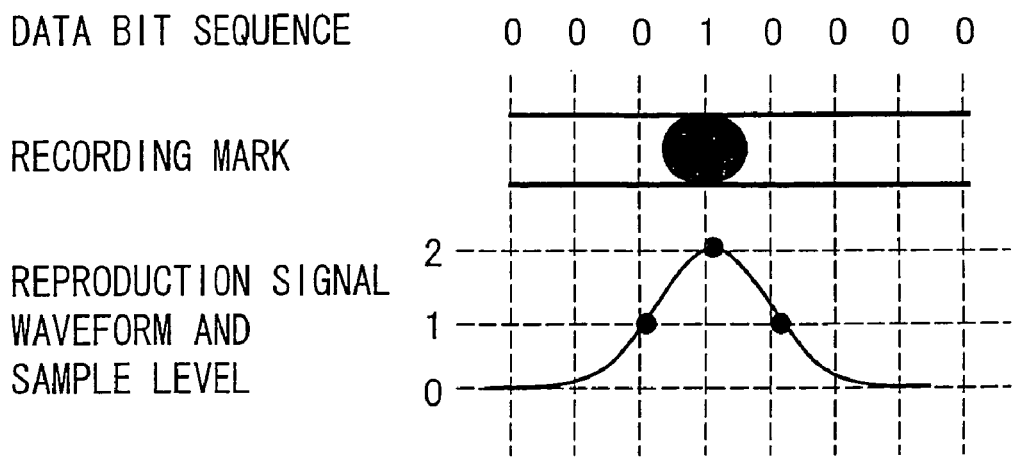
FIG. 35 is a schematic illustrating a reproduction signal waveform according to PR(1, 2, 1) properties.
Figure 36:
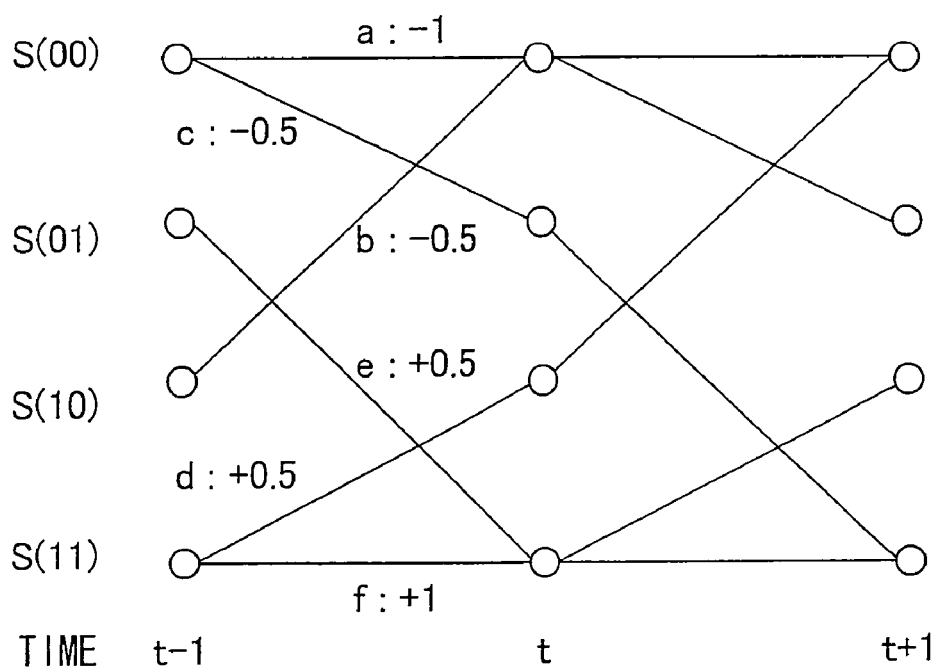
FIG. 36 is a trellis diagram used in Viterbi decoding.
Figure 37:
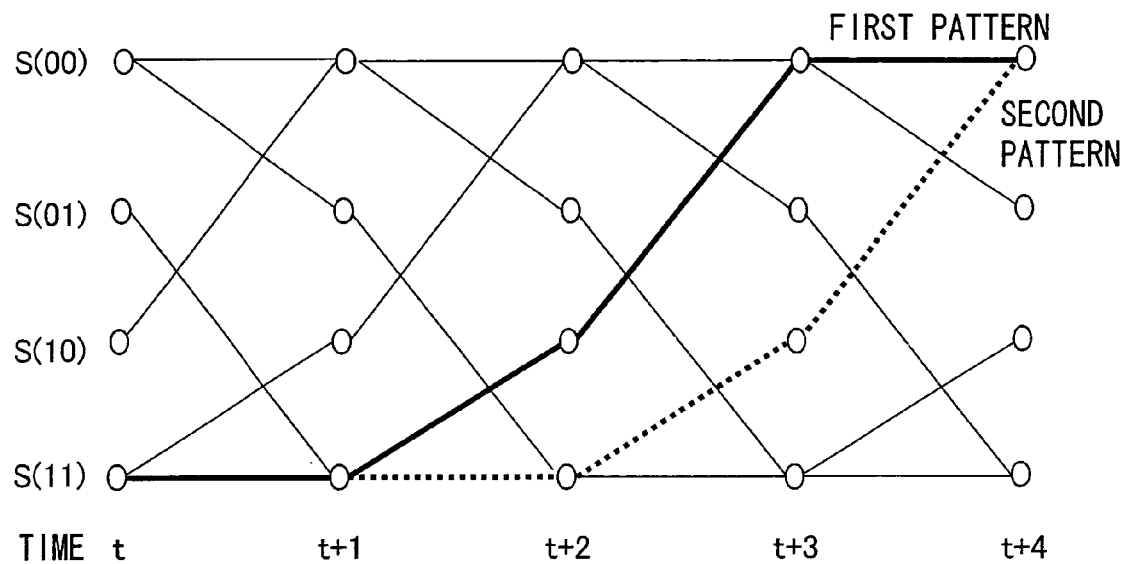
FIG. 37 is a trellis diagram used in Viterbi decoding.
Figure 38:
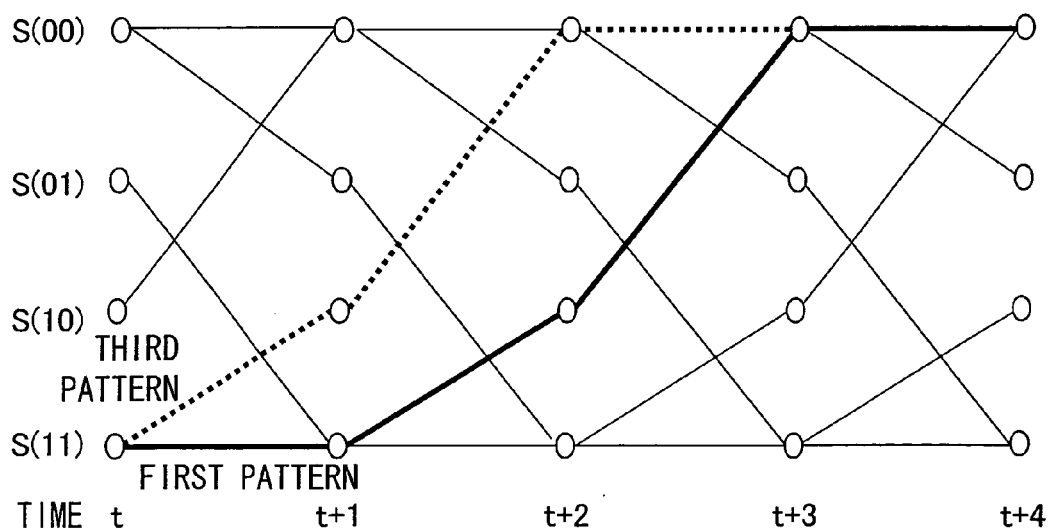
FIG. 38 is a trellis diagram used in Viterbi decoding.
Figure 39:
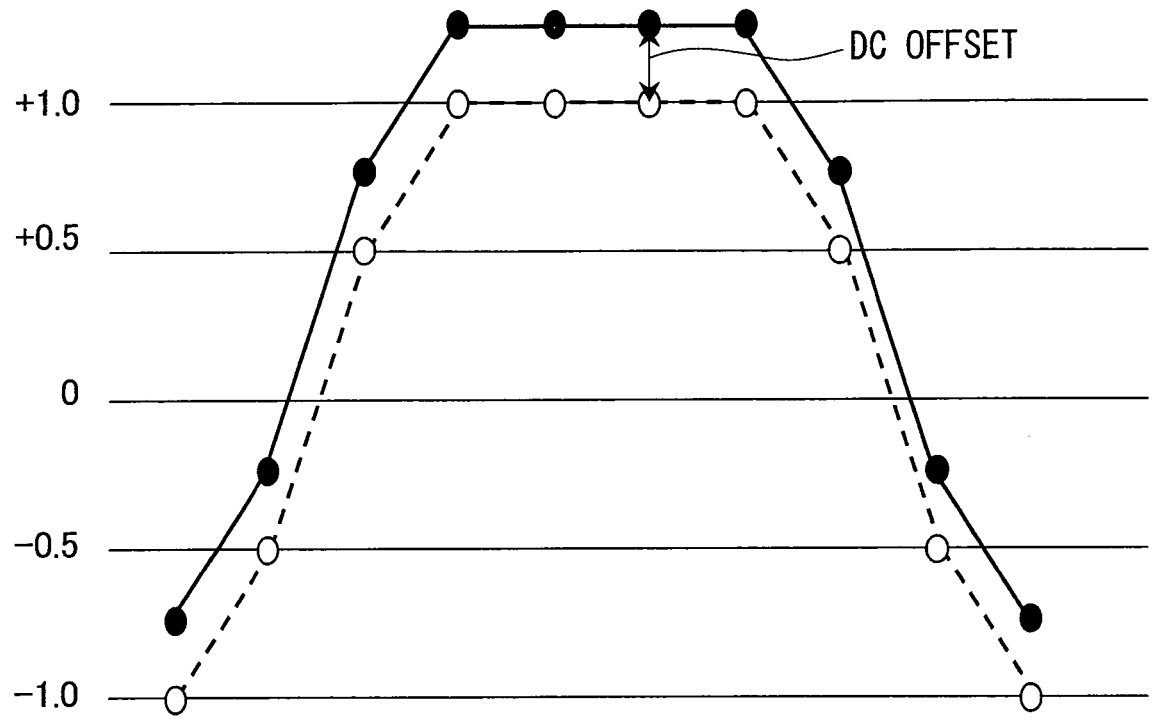
FIG. 39 illustrates a state in which DC off set is given to a reproduction signal.
Figure 40:
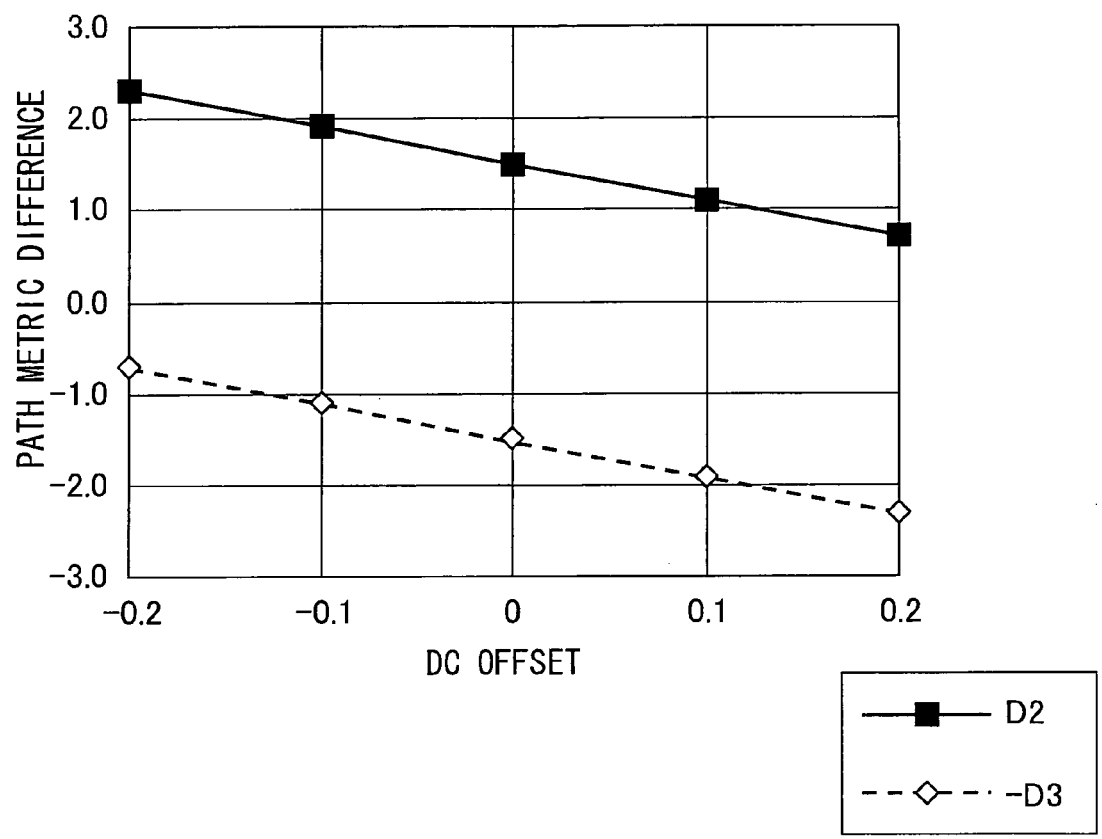
FIG. 40 illustrates evaluation of a reproduction signal.
Figure 41:
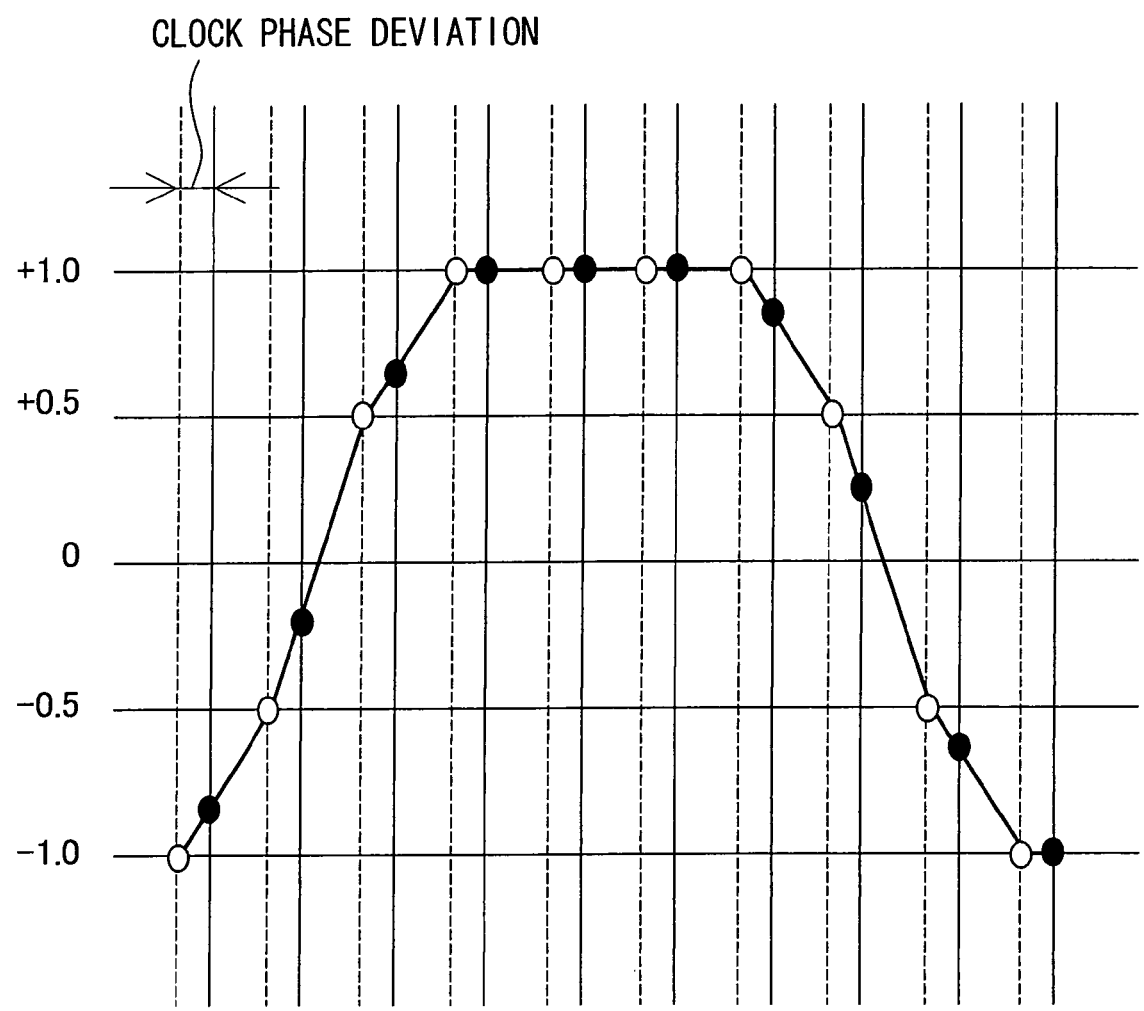
FIG. 41 illustrates a state in which a clock phase lag is given to a reproduction signal.
Figure 42:
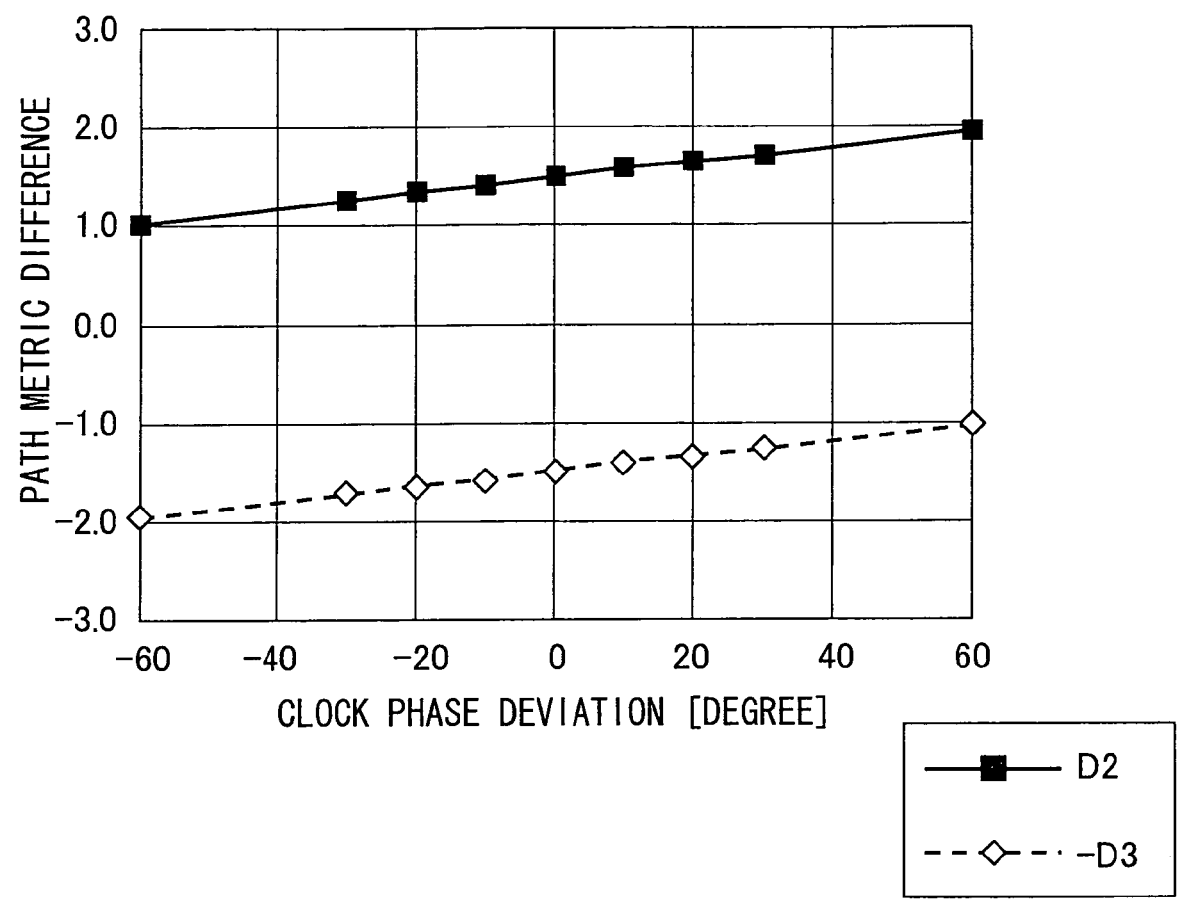
FIG. 42 illustrates evaluation of a reproduction signal.

With reference to a trellis diagram shown in FIG. 34, the following describes the Viterbi decoding that uses the level ratio of samples as described above. In FIG. 34, S(000), S(001), S(011), S(100), S(110), and S(111) each represents a different state. Here, S(010) and S(101) are missing from the diagram because the bit sequences "010" and "101" cannot occur due to the d=1 (1,7) RLL.

FIG. 34 illustrates two paths under a correct state in the trellis diagram when the specific pattern is "1110000". A thick full line indicates a correct path and a thick broken line indicates an error path. When path metric differences at a time when the pattern is detected are classified into the by-recording-information path metric differences, the same effect as the foregoing embodiments can be obtained.

Further, in FIG. 34, the state S (111) is the starting point at time t. However, the same effect as the foregoing embodiments can be obtained when the state S (011) is the starting point at time t. Further, in FIG. 34, the state S(000) is the end point at time t+4. However, the same effect as the foregoing embodiments can be obtained when the state S (001) is the end point at time t+4. Namely, as long as the specific pattern includes "11000", the bit before and after the specific pattern may be either 0 or 1. In the same way, when "11100" is used as the specific pattern, as long as the specific pattern includes "11100", the bit before and after the specific pattern may be either 0 or 1. Further, as long as the specific pattern includes "00011", or "00111", the bit before and after the specific pattern may be either 0 or 1 as with the above examples.

Further, in the embodiments, (1, 7) RLL code is used as a run length limited code with d=1. However, the present invention is not limited to this. Further, in the foregoing embodiments, classification by recording information is performed by using only a mark length. However, the same effect as the foregoing embodiments can be obtained when classification by recording information is performed by using a mark length and a space length before or after the mark length.

Further, each of the foregoing embodiments describes an optical disc reproduction device. However, the present invention is not limited to this. The same effect can be obtained by using a signal reproducing device based on PRML. Namely, the present invention can be applied to a magnetic recording device, a communication data reception device and the like.

Further, the recording/reproducing device includes a CPU for executing a command of a control program for realizing each of the functions, a ROM for storing the program, a RAM for developing the program, a storage device (storage medium) such as a memory for storing the program and various items of data, and the like.

The object of the present invention also can be realized in such a manner that: the reproducing device is provided with a computer-readable storage medium for storing a program code (an executable program, an intermediate code program, and a source program) of a control program being software for realizing the above functions, and the computer reads out and executes the program code stored in the storage medium. At that time, the program code itself having been read out from the storage medium realizes the above functions, and accordingly the storage medium for storing the program constitutes the present invention.

Here, the storage medium as the program media is a storage medium which is detachable from a main body and permanently stores a program. Examples of the storage medium include: tapes such as a magnetic tape and a cassette tape, discs such as a magnetic disc (e.g. a floppy disc or a hard disc) and an optical disc (e.g. CD-ROM/MO/MD/DVD), cards such as an IC card (including a memory card) and an optical card, and a semiconductor memory such as a mask ROM, EPROM, EEPROM, and a flash ROM.

Further, each of the embodiments describes a case where an optical disc device based on optical modulation recording is used. However, the present invention is not limited to this, and may use an optical disc device based on optical-magnetic modulation recording.

Further, the optical disc device 1 includes: a CPU (Central Processing Unit) that is calculation means for executing a command of a program (such as a control program and a recording condition setting program) for realizing the functions; a ROM (Read Only Memory) that is storage means for storing the program; a RAM (Random Access Memory) that is storage means for developing the program; a storage device (storage medium) (not shown) such as a memory, that is storage means for storing the program and various items of data; and the like.

The object of the present invention also can be realized in such a manner that: the optical disc device 1 is provided with a computer-readable storage medium for storing a program code (an executable program, an intermediate code program, and a source program) of a control program being software for realizing the above functions, and the computer (alternatively, a CPU or MPU) reads out and executes the program code stored in the storage medium. At that time, the program code itself having been read out from the storage medium realizes the above functions, and accordingly the storage medium for storing the program constitutes the present invention.

Further, the control program according to the present embodiment is a control program for causing the optical disc device 1 to function, the control program causing a computer to function as the foregoing means.

Therefore, it is possible to provide the control program for causing a computer to function as the means.

Further, the computer-readable storage medium according to the present embodiment stores the control program as described above.

Therefore, it is possible to provide the computer-readable storage medium that stores the control program.

Note that the present invention is not limited to the foregoing embodiments, and a variety of modifications are possible within the scope specified by claims. Embodiments obtained by combining technical means disclosed in different embodiments are also included in technical means of the present invention.

The present invention makes it possible to set a recording condition without an influence of a DC offset which occurs in a reproduction signal or an influence of a clock phase deviation which occurs in a reproduction clock. Therefore, the present invention can be applied to a recording/reproducing device such as an optical recording/reproducing device, an optical magnetic recording/reproducing device, and a magnetic recording/reproducing device, as long as the recording/reproducing device is capable of recordation on/reproduction from a storage medium.

As described above, the recording condition setting device according to the present invention includes: Viterbi decoding means for generating one or more path metric differences while decoding one or more bit sequences by Viterbi decoding from a reproduction signal from the storage medium so as to generate one or more decoded bit sequences; specific pattern detection means for detecting, as a specific pattern, one or more patterns having been set with respect to each of the plural items of recording information, from the decoded bit sequences generated by the Viterbi decoding means; path metric difference classification means which includes (i) specific path metric difference extraction means for extracting one or more specific path metric differences corresponding to the specific patterns detected by the specific pattern detection means, from the path metric differences generated by the Viterbi decoding means and (ii) by-recording-information pattern detection means for detecting one or more by-recording-information patterns having corresponding recording information out of the plural items of recording information from the decoded bit sequences including the specific patterns detected by the specific pattern detection means, said path metric difference classification means classifying the specific path metric differences extracted by the specific path metric difference extraction means into one or more by-recording-information path metric differences corresponding to the by-recording-information patterns detected by the by-recording-information pattern detection means; and recording condition setting means for setting the recording condition based on the by-recording-information path metric differences classified by the path metric difference classification means. Therefore, it is possible to suitably grasp a state of edge deviation between recording mark lengths caused by the path metric differences, without an influence of adding a DC offset to a reproduction signal or an influence of a clock phase deviation which occurs in a reproduction clock. As a result, it is possible to store recording information on the storage medium under a suitable recording condition under which the edge deviation between the recording mark lengths is taken into account.

The present invention may be arranged so that: the recording condition setting means includes average value calculation means for calculating an average value of by-recording-information path metric differences in each group obtained through classification performed by the path metric difference classification means; and the recording condition setting means sets the recording condition based on the average value calculated by the average value calculation means.

At that time, the average value of path metric differences is calculated by recording information. Therefore, by reducing unevenness of the path metric differences, it is possible to set a more suitable recording condition.

Further, in order to obtain a more suitable recording condition, it is preferable that: the recording condition setting means includes normalization means for normalizing each group of the by-recording-information path metric differences based on the average value calculated by the average value calculation means, and the recording condition setting means sets the recording condition based on each group of the by-recording-information path metric differences normalized by the normalization means.

Further, the present invention may be arranged so that: the recording condition setting means includes frequency distribution calculation means for calculating frequency distributions with respect to each group of the by-recording-information path metric differences obtained through classification performed by the path metric difference classification means; and the recording condition setting means sets the recording condition so that the frequency distributions calculated by the frequency distribution calculation means are in proximity to each other between the plural items of recording information.

At that time, the average value of path metric differences is calculated by recording information. Therefore, by reducing unevenness of the path metric differences, it is possible to set a more suitable recording condition.

Further, in order to obtain a more suitable recording condition, it is preferable that: the recording condition setting means includes frequency distribution calculation means for calculating frequency distributions with respect to each group of the by-recording-information path metric differences obtained through classification performed by the path metric difference classification means; and the recording condition setting means sets the recording condition so that each of the frequency distributions calculated by the frequency distribution calculation means is within a predetermined range.

The recording condition setting means sets at least a recording power out of a recording condition.

As described above, when it is possible to suitably set at least a recording power, it is possible to suitably set a mark length to be recorded.

It is preferable that: the recording condition setting device with aforementioned arrangements is included in a recording/reproducing device that sets a recoding condition constituted of a plurality of elements corresponding to each of plural items of recoding information.

As a result, it is possible to set the recording condition more suitably. Therefore, it is possible to form a recoding mark with higher accuracy.

The following describes a recording condition setting method for the purpose of setting a more suitable recoding condition.

Namely, it is preferable that: the recording condition is set so that distributions of the by-recording-information path metric differences are in proximity to each other.

Further, it is preferable that: a recording condition is set so that each of the distributions of the by-recording-information path metric differences is within a predetermined range.

Further, it is preferable that: the predetermined range is set based on an average value of the by-recording-information path metric differences.

It is preferable that: the recording condition is set based on values obtained by normalizing the by-recording-information path metric differences by an average value of the specific path metric differences.

It is preferable that: the recording condition is set based on an average value of by-recording-information path metric differences in each group obtained through classification of those by-recording-information path metric differences.

It is preferable that: one of the specific patterns is "11000".

Further, it is preferable that: one of the specific patterns is "11100".

It is preferable that: when "1" out of the specific patterns indicates a mark and "0" out of the specific patterns indicates a non-mark in setting the recording condition, an element for changing a position of a rear edge section of the recording mark is changed, the element being one of the elements constituting the recording condition.

It is preferable that: one of the specific patterns is "00111".

Further, it is preferable that: one of the specific patterns is "00011".

It is preferable that: when "1" out of the specific patterns indicates a mark and "0" out of the specific patterns indicates a non-mark in setting the recording condition, an element for changing a position of a front edge section of the recording mark is changed, the element being one of the elements constituting the recording condition.

At that time, it is preferable that: at least a recording power is changed in setting the recording condition.

The control program according to the present invention is a control program for operating the recording/reproducing device and is a control program for causing a computer to function as plural means of the recording condition setting device.

As a result, it is possible for a multi-purpose computer to control operations of the recording/reproducing device. Therefore, it is possible to realize the recording condition setting device inexpensively.

The present invention may be arranged so that the control program is stored in a computer-readable storage medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A recording condition setting device for setting a recording condition that is constituted of a plurality of elements corresponding to each of plural items of recording information and is used to form a recording mark on a storage medium, said recording condition setting device comprising:

Viterbi decoding means for generating one or more path metric differences while decoding one or more bit sequences by Viterbi decoding from a reproduction signal from the storage medium so as to generate one or more decoded bit sequences;

specific pattern detection means for detecting, as a specific pattern, one or more patterns having been set with respect to each of the plural items of recording information, from the decoded bit sequences generated by the Viterbi decoding means;

path metric difference classification means which includes (i) specific path metric difference extraction means for extracting one or more specific path metric differences corresponding to the specific patterns detected by the specific pattern detection means, from the path metric differences generated by the Viterbi decoding means and (ii) by-recording-information pattern detection means for detecting one or more by-recording-information patterns having corresponding recording information out of the plural items of recording information from the decoded bit sequences including the specific patterns detected by the specific pattern detection means, said path metric difference classification means classifying the specific path metric differences extracted by the specific path metric difference extraction means into one or more by-recording-information path metric differences corresponding to the by-recording-information patterns detected by the by-recording-information pattern detection means; and recording condition setting means for setting the recording condition based on the by-recording-information path metric differences classified by the path metric difference classification means.

2. The recording condition setting device as set forth in claim 1, wherein:

the recording condition setting means includes average value calculation means for calculating an average value of by-recording-information path metric differences in each group obtained through classification performed by the path metric difference classification means; and the recording condition setting means sets the recording condition based on the average value calculated by the average value calculation means.

3. The recording condition setting device as set forth in claim 2, wherein:

the recording condition setting means includes normalization means for normalizing each group of the by-recording-information path metric differences based on the average value calculated by the average value calculation means, and the recording condition setting means sets the recording condition based on each group of the by-recording-information path metric differences normalized by the normalization means.

4. The recording condition setting device as set forth in claim 1, wherein:

the recording condition setting means includes frequency distribution calculation means for calculating frequency distributions with respect to each group of the by-recording-information path metric differences obtained through classification performed by the path metric difference classification means; and the recording condition setting means sets the recording condition so that the frequency distributions calculated by the frequency distribution calculation means are in proximity to each other between the plural items of recording information.

5. The recording condition setting device as set forth in claim 4, wherein:
the recording condition setting means includes frequency distribution calculation means for calculating frequency distributions with respect to each group of the by-recording-information path metric differences obtained through classification performed by the path metric difference classification means; and
the recording condition setting means sets the recording condition so that each of the frequency distributions calculated by the frequency distribution calculation means is within a predetermined range.

6. The recording condition setting device as set forth in claim 1, wherein the recording condition setting means sets at least a recording power out of the recording condition.

7. A recording/reproducing device, comprising a recording condition setting device for setting a recording condition which is constituted of a plurality of elements corresponding to each of plural items of recording information and is used to form a recording mark on a storage medium, wherein
the recording condition setting device includes:
Viterbi decoding means for generating one or more path metric differences while decoding one or more bit sequences by Viterbi decoding from a reproduction signal from the storage medium so as to generate one or more decoded bit sequences;
specific pattern detection means for detecting, as a specific pattern, one or more patterns having been set with respect to each of the plural items of recording information, from the decoded bit sequences generated by the Viterbi decoding means;
path metric difference classification means which includes (i) specific path metric difference extraction means for extracting one or more specific path metric differences corresponding to the specific patterns detected by the specific pattern detection means, from the path metric differences generated by the Viterbi decoding means and (ii) by-recording-information pattern detection means for detecting one or more by-recording-information patterns having corresponding recording information out of the plural items of recording information from the decoded bit sequences including the specific patterns detected by the specific pattern detection means, said path metric difference classification means classifying the specific path metric differences extracted by the specific path metric difference extraction means into one or more by-recording-information path metric differences corresponding to the by-recording-information patterns detected by the by-recording-information pattern detection means; and
recording condition setting means for setting the recording condition based on the by-recording-information path metric differences classified by the path metric difference classification means.

8. A method for causing a recording/reproducing device, which forms a recording mark on a storage medium on the basis of a recording condition constituted of a plurality of elements corresponding to plural items of recording information, to set the recording condition,
said recording condition setting method being carried out by a recording condition setting device of the recording/reproducing device, the method comprising:
a first step of generating one or more path metric differences while decoding one or more bit sequences by Viterbi decoding from a reproduction signal from the storage medium so as to generate one or more decoded bit sequences;
a second step of detecting one or more specific patterns from the decoded bit sequences generated in the first step;
a third step of extracting one or more specific path metric differences corresponding to the specific patterns detected in the second step, from the path metric differences generated in the first step;
a fourth step of detecting one or more by-recording-information patterns having corresponding recording information out of the plural items of recording information from the decoded bit sequences including the specific patterns detected in the second step;
a fifth step of classifying the specific path metric differences extracted in the third step into one or more by-recording-information path metric differences corresponding to the by-recording-information patterns detected in the fourth step; and
a sixth step of setting the recording condition based on the by-recording-information path metric differences classified in the fifth step.

9. The method as set forth in claim 8, wherein the recording condition is set so that distributions of the by-recording-information path metric differences are in proximity to each other.

10. The method as set forth in claim 9, wherein a recording condition is set so that each of the distributions of the by-recording-information path metric differences is within a predetermined range.

11. The method as set forth in claim 10, wherein the predetermined range is set based on an average value of the by-recording-information path metric differences.

12. The method as set forth in claim 8, wherein the recording condition is set based on values obtained by normalizing the by-recording-information path metric differences by an average value of the specific path metric differences.

13. The method as set forth in claim 8, wherein the recording condition is set based on an average value of by-recording-information path metric differences in each group obtained through classification of those by-recording-information path metric differences.

14. The method as set forth in claim 8, wherein one of the specific patterns is "11000".

15. The method as set forth in claim 14, wherein: when "1" out of the specific patterns indicates a mark and "0" out of the specific patterns indicates a non-mark in setting the recording condition, an element for changing a position of a rear edge section of the recording mark is changed, the element being one of the elements constituting the recording condition.

16. The method as set forth in claim 8, wherein one of the specific patterns is "11100".

17. The method as set forth in claim 16, wherein: when "1" out of the specific patterns indicates a mark and "0" out of the specific patterns indicates a non-mark in setting the recording condition, an element for changing a position of a rear edge section of the recording mark is changed, the element being one of the elements constituting the recording condition.

18. The method as set forth in claim 8, wherein one of the specific patterns is "00111".

19. The method as set forth in claim 18, wherein: when "1" out of the specific patterns indicates a mark and "0" out of the specific patterns indicates a non-mark in setting the recording condition, an element for changing a position of a front edge section of the recording mark is changed, the element being one of the elements constituting the recording condition.

20. The method as set forth in claim 8, wherein one of the specific patterns is "00011".

21. The method as set forth in claim 20, wherein: when "1" out of the specific patterns indicates a mark and "0" out of the specific patterns indicates a non-mark in setting the recording condition, an element for changing a position of a front edge section of the recording mark is changed, the element being one of the elements constituting the recording condition.

22. The method as set forth in claim 8, wherein at least a recording power is changed in setting the recording condition.

23. A computer-readable storage medium for storing a control program for causing a computer to function as respective means of a recording condition setting device, said recording condition setting device being used for setting a recording condition which is constituted of a plurality of elements corresponding to each of plural items of recording information and is used to form a recording mark on a storage medium, said recording condition setting device including:

Viterbi decoding means for generating one or more path metric differences while decoding one or more bit sequences by Viterbi decoding from a reproduction signal from the storage medium so as to generate one or more decoded bit sequences;

specific pattern detection means for detecting, as a specific pattern, one or more patterns having been set with respect to each of the plural items of recording information, from the decoded bit sequences generated by the Viterbi decoding means;

path metric difference classification means which includes (i) specific path metric difference extraction means for extracting one or more specific path metric differences corresponding to the specific patterns detected by the specific pattern detection means, from the path metric differences generated by the Viterbi decoding means and (ii) by-recording-information patterns detection means for detecting one or more by-recording-information patterns having corresponding recording information out of the plural items of recording information from the decoded bit sequences including the specific patterns detected by the specific pattern detection means, said path metric difference classification means classifying the specific path metric differences extracted by the specific path metric difference detection means into one or more by-recording-information path metric differences corresponding to the by-recording-information patterns detected by the by-recording-information pattern detection means; and recording condition setting means for setting the recording condition based on the by-recording-information path metric differences classified by the path metric difference classification means.

\* \* \* \* \*